United States Patent
Ellis et al.

(10) Patent No.: US 9,514,563 B2
(45) Date of Patent: Dec. 6, 2016

(54) GRAPHICS PROCESSING SYSTEMS

(71) Applicant: ARM Limited, Cambridge (GB)

(72) Inventors: Sean Tristram Ellis, Farnham (GB); Jorn Nystad, Trondheim (NO); Andreas Engh-Halstvedt, Trondheim (NO)

(73) Assignee: ARM LIMITED, Cambridge (GB)

( * ) Notice: Subject to any disclaimer, the term of this patent is extended or adjusted under 35 U.S.C. 154(b) by 335 days.

(21) Appl. No.: 14/015,897

(22) Filed: Aug. 30, 2013

(65) Prior Publication Data

US 2015/0062154 A1    Mar. 5, 2015

(51) Int. Cl.
*G06T 15/00* (2011.01)

(52) U.S. Cl.
CPC .................. *G06T 15/005* (2013.01)

(58) Field of Classification Search
None
See application file for complete search history.

(56) References Cited

U.S. PATENT DOCUMENTS

| | | | |
|---|---|---|---|
| 5,905,506 A | 5/1999 | Hamburg | |
| 6,044,178 A | 3/2000 | Lin | |
| 6,380,935 B1 | 4/2002 | Heeschen et al. | |
| 6,466,223 B1 | 10/2002 | Dorbie et al. | |
| 6,614,448 B1 | 9/2003 | Garlick et al. | |
| 6,674,443 B1 | 1/2004 | Chowdhuri et al. | |
| 6,798,421 B2 | 9/2004 | Baldwin | |
| 6,856,320 B1 | 2/2005 | Rubinstein et al. | |
| 6,914,609 B2 * | 7/2005 | Tang et al. | 345/557 |
| 6,943,809 B2 | 9/2005 | Dermer | |
| 7,053,893 B1 | 5/2006 | Molnar et al. | |
| 7,102,646 B1 | 9/2006 | Rubinstein et al. | |
| 7,170,515 B1 | 1/2007 | Zhu | |
| 7,920,139 B2 | 4/2011 | Nystad et al. | |
| 8,059,144 B2 | 11/2011 | Faye-Lund et al. | |
| 8,106,921 B2 | 1/2012 | Nystad et al. | |

(Continued)

FOREIGN PATENT DOCUMENTS

| | | |
|---|---|---|
| EP | 0829820 A2 | 3/1998 |
| GB | 2353686 | 2/2001 |
| JP | 9-212678 | 8/1997 |

OTHER PUBLICATIONS

Search Report dated Feb. 17, 2015 in GB Patent Application No. GB1415243.3, 3 pages.

(Continued)

*Primary Examiner* — Kee M Tung
*Assistant Examiner* — Nicholas R Wilson
(74) *Attorney, Agent, or Firm* — Vierra Magen Marcus LLP

(57) ABSTRACT

When processing a set of tiles to generate an output in a tile based graphics processing pipeline, the pipeline, for one or more tiles of the set of tiles, renders one or more render targets containing data to be used in a processing operation (602), and stores the render targets in the tile buffer (604). It also stores some but not all of the sampling position values for a render target or targets for use when processing an adjacent tile of the set of tiles (606). It then performs a processing operation for the tile using the stored render target or targets (608) and one or more stored sampling position values from another, adjacent tile of the set of tiles (610), to generate an output for the tile (612).

24 Claims, 11 Drawing Sheets

(56) References Cited

U.S. PATENT DOCUMENTS

| | | | |
|---|---|---|---|
| 8,212,832 | B2 | 7/2012 | Stefanidis et al. |
| 8,325,203 | B1 | 12/2012 | Donham |
| 2002/0126138 | A1 | 9/2002 | Shekter |
| 2003/0169265 | A1 | 9/2003 | Emberling |
| 2004/0012599 | A1 | 1/2004 | Laws |
| 2006/0018558 | A1* | 1/2006 | Kuniba ............ 382/232 |
| 2006/0033743 | A1 | 2/2006 | Morein |
| 2006/0126736 | A1 | 6/2006 | Shen |
| 2008/0008402 | A1 | 1/2008 | Chang |
| 2008/0273032 | A1 | 11/2008 | Brennan |
| 2008/0303841 | A1 | 12/2008 | Newhall |
| 2011/0080419 | A1 | 4/2011 | Croxford et al. |
| 2011/0148919 | A1* | 6/2011 | Heggelund et al. .......... 345/629 |
| 2012/0280973 | A1 | 11/2012 | Nagy |
| 2013/0155103 | A1 | 6/2013 | Kakarlapudi et al. |
| 2013/0293544 | A1 | 11/2013 | Schreyer et al. |
| 2014/0184623 | A1 | 7/2014 | Frascati et al. |
| 2014/0192075 | A1 | 7/2014 | Stamoulis et al. |

OTHER PUBLICATIONS

Notice of Allowance dated Mar. 27, 2015 in U.S. Appl. No. 13/875,831, 18 pages.
Final Office Action dated Apr. 23, 2015 in U.S. Appl. No. 14/267,969, 45 pages.
Lassen, et al., U.S. Appl. No. 14/267,969, filed May 2, 2014, titled "Graphics Processing Systems,".
Lassen et al., U.S. Appl. No. 13/875,810, filed May 2, 2013, titled "Graphics Processing Systems,".
Nystad, et al., U.S. Appl. No. 13/875,822, filed May 2, 2013, titled "Graphics Processing Systems,".
J.D. Foley et al., "Computer Graphic Principles and Practice," Second Edition in C, 1997, pp. 886-891.
F.I. Parke, "Simulation and Expected Performance Analysis of Multiple Processor Z-Buffer Systems," ACM 1980, pp. 48-56.
Search Report for GB0906691.1, dated Aug. 13, 2009, 1 page.
Deferred shading, Wikipedia, last modified Aug. 26, 2013, available at: http://en.wikipedia.org/wiki/Deferred_shading, 6 pages.
Search Report for GB1121886.4, dated Apr. 20, 2012, 1 page.
Mark et al., "The F-Buffer: A Rasterization-Order FIFO Buffer for Multi-Pass Rendering," SIGGRAPH, 2001, pp. 1-7.
Bavoil et al., "Multi-Fragment Effects on the GPU using the k-Buffer," Scientific Computing and Imaging Institute, Univ. of Utah, ACM SIGGRAPH Symposium on Interactive 3D Graphics and Games, 2007, 8 pages.
Response to Office Action filed Mar. 19, 2015 in U.S. Appl. No. 13/875,810, 16 pages.
Response to Office Action filed Mar. 19, 2015 in U.S. Appl. No. 14/267,969, 17 pages.
Response to Office Action filed Feb. 20, 2015 in U.S. Appl. No. 13/875,831, 11 pages.
Final Office Action dated Jun. 19, 2015 in U.S. Appl. No. 13/875,810, 53 pages.
Office Action dated Jul. 7, 2015 in U.S. Appl. No. 13/875,822, 66 pages.
Engh-Halstvedt, et al., U.S. Appl. No. 13/875,831, filed May 2, 2013, titled "Graphics Processing Systems,".
Office Action dated Nov. 19, 2014 in U.S. Appl. No. 13/875,810, 26 pages.
Office Action dated Nov. 19, 2014 in U.S. Appl. No. 14/267,969, 27 pages.
Office Action dated Nov. 20, 2014 in U.S. Appl. No. 13/875,831, 37 pages.
Combined Search and Examination Report dated Nov. 4, 2014 in Great Britain Patent Application No. GB1407752.3, 5 pages.
Combined Search and Examination Report dated Nov. 4, 2014 in GB Patent Application No. GB1407756.4, 5 pages.
Combined Search and Examination Report dated Nov. 4, 2014 in GB Patent Application No. GB1407757.2, 5 pages.
Office Action dated Apr. 27, 2016, in U.S. Appl. No. 13/875,822, filed May 2, 2013.
Office Action dated Apr. 22, 2016, in U.S. Appl. No. 14/267,969, filed May 2, 2014.
Amendment dated Oct. 7, 2015, in U.S. Appl. No. 13/875,822, filed May 2, 2013.
Amendment dated Oct. 19, 2015, in U.S. Appl. No. 13/875,810, filed May 2, 2013.
Office Action dated Dec. 2, 2015, in U.S. Appl. No. 13/875,810, filed May 2, 2013.
Amendment dated Oct. 23, 2015 in U.S. Appl. No. 14/267,969, filed May 2, 2014.
Amendment dated Mar. 15, 2016, in U.S. Appl. No. 14/267,969, filed May 2, 2014.
Amendment dated Apr. 4, 2016, in U.S. Appl. No. 13/875,810, filed May 2, 2013.
Amendment dated Apr. 11, 2016, in U.S. Appl. No. 13/875,822, filed May 2, 2013.
Office Action dated Dec. 17, 2015, in U.S. Appl. No. 14/267,969, filed May 2, 2014.
Office Action dated Dec. 10, 2015, in U.S. Appl. No. 13/875,822, filed May 2, 2013.

* cited by examiner

GRAPHICS PROCESSING SYSTEMS

BACKGROUND

The technology described herein relates to graphics processing systems, and in particular to tile-based graphics processing systems.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

As is known in the art, graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data (which may, e.g., represent all or part of a frame to be displayed).

The processing stages of the graphics processing pipeline may, e.g., be in the form of fixed-function units (hardware), or some or all of the functional units may be programmable (be provided by programmable circuitry that can be programmed to perform the desired operation). For example, a graphics processing pipeline may include programmable vertex and/or fragment shaders for performing desired vertex and/or fragment shading operations.

A tile-based graphics processing pipeline will also include a so-called tile buffer that stores rendered fragment data at the end of the pipeline until a given tile is completed and written out to an external memory, such as a frame buffer, for use. This local, pipeline memory is used to retain fragment data locally before the data is finally exported to external memory and is typically in the form of on-chip RAM that is set aside for this purpose.

A graphics processing pipeline will typically have a fixed allocation of RAM set aside for use as the tile buffer. This may comprise, for example, one or more colour buffers each of a size adequate to store one rendered tile's worth of colour (RGB or RGBa) data, together with a depth and/or depth and stencil buffer for storing a tile's worth of depth and/or stencil data.

In order to facilitate the writing back of rendered graphics data from the tile buffers to external memory, such as a frame buffer, a graphics processing pipeline will typically include write out circuitry coupled to the tile buffer pipeline memory for this purpose. The graphics processing pipeline may also be provided with fixed-function downsampling circuitry for downsampling the locally stored data before it is written out to external memory where that is required (as may, e.g., be the case where a frame to be displayed is rendered in a supersampled or multisampled manner for anti-aliasing purposes).

It is becoming increasingly desirable when performing graphics processing to perform so-called "deferred shading". When doing deferred shading, the application performs multiple render passes. It uses multiple render targets in a first rendering pass to output colour, depth, surface normals, and potentially other attributes, to separate render targets. These rendering outputs are then usually stored in a set of buffers, e.g. in main memory, usually referred to as G-buffers (general buffers) for use. The outputs from the first rendering pass are then read back in to the graphics processing pipeline to do complex light calculations and compositions to produce the final result in a second rendering pass. This requires a lot of bandwidth to read and write all of the render targets (as an application will usually, for example, write out multiple render targets in the first pass, and then use render targets as textures in the second pass to generate the final result).

In graphics processors in lower power and portable devices, the bandwidth cost of writing data to external memory from the graphics processing pipeline and for the converse operation of reading data from external memory to the local memory of the graphics processing pipeline for deferred shading can be a significant issue. Bandwidth consumption can be a big source of heat and of power consumption, and so it is generally desirable to try to reduce bandwidth consumption for external memory reads and writes in embedded graphics processing systems.

Various techniques have accordingly already been proposed to try to reduce bandwidth consumption for external memory reads and writes in graphics processing systems. These techniques include, for example, using texture and frame buffer compression to try to reduce the amount of data that must be written/read, and/or trying to eliminate unnecessary external memory (e.g. frame buffer) read and write transactions (operations).

Notwithstanding these known techniques, the Applicants believe that there remains scope for further improvements for improved techniques for performing, e.g., deferred shading, in graphics processing pipelines, and in particular in tile-based graphics processing pipelines.

BRIEF DESCRIPTION OF THE DRAWINGS

A number of embodiments of the technology described herein will now be described by way of example only and with reference to the accompanying drawings, in which.

Like reference numerals are used for like features where appropriate in the drawings.

DETAILED DESCRIPTION

Figure 1:
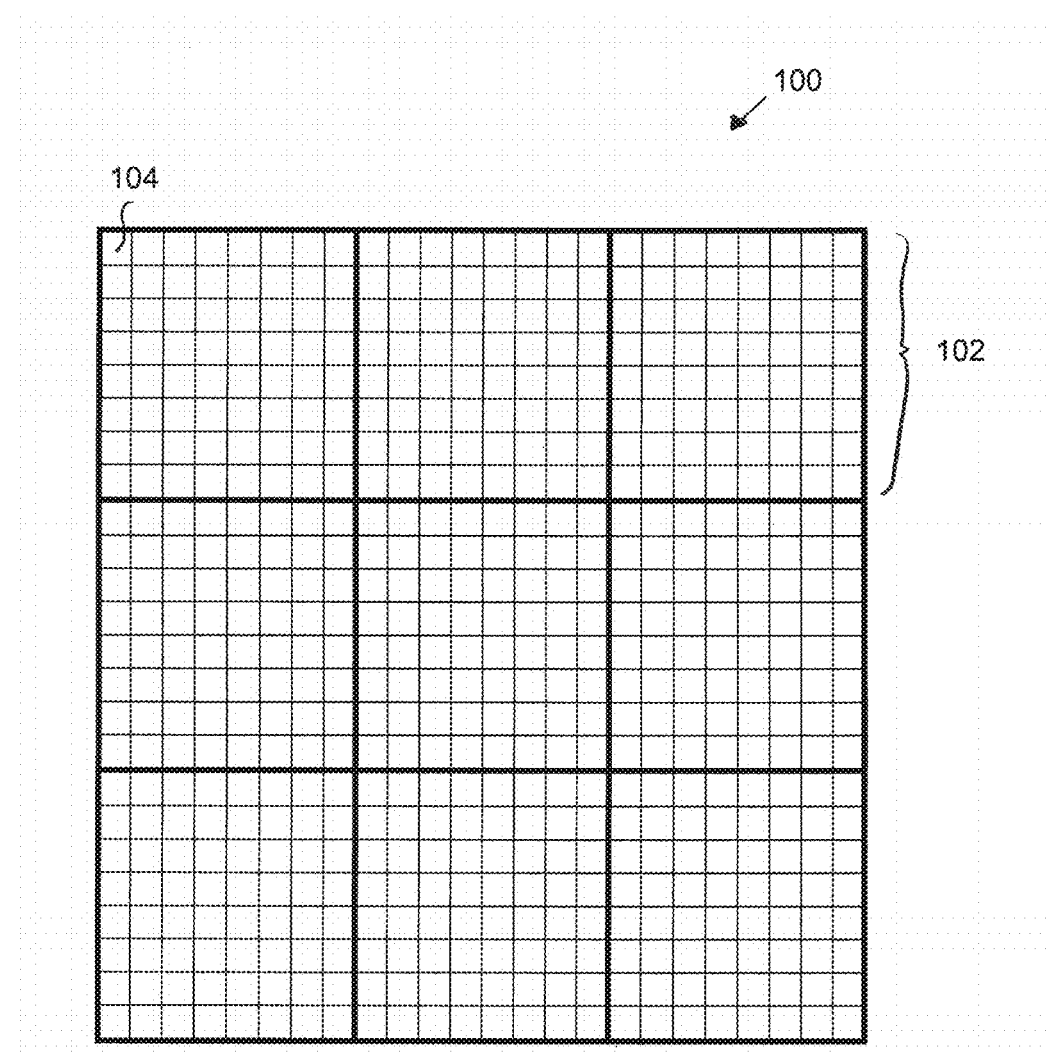
FIG. 1 shows an array of sampling positions according to embodiments of the technology described herein.

A first embodiment of the technology described herein comprises a method of operating a tile-based graphics processing pipeline that comprises:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
a tile buffer configured to store rendered fragment data locally to the graphics processing pipeline prior to that data being written out to an external memory; and
a write out stage configured to write data stored in the tile buffer to an external memory; the method comprising:
the graphics processing pipeline, when processing a set of tiles to generate an output:
for a first tile of the set of tiles:
rendering at least one render target containing data to be used in a processing operation, and storing the at least one render target in the tile buffer, each render target comprising an array of sampling position values corresponding to an array of sampling points for the tile in question;
performing a processing operation for the tile using the stored at least one render target to generate an output for the tile; and
storing some but not all of the sampling position values for a render target or targets of the at least one render target for the tile for use when processing at least one other tile of the set of tiles; and
for another tile of the set of tiles:
rendering at least one render target containing data to be used in a processing operation and storing the at least one render target in the tile buffer, each render target comprising an array of sampling position values corresponding to an array of sampling points for the tile in question; and
performing a processing operation for the another tile using the stored at least one render target and one or more of the sampling position values from the first tile that were stored for use when processing another tile of the set of tiles to generate an output for the another tile.

A second embodiment of the technology described herein comprises a tile-based graphics processing pipeline comprising:
- a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
- a tile buffer configured to store rendered fragment data locally to the graphics processing pipeline prior to that data being written out to an external memory; and
- a write out stage configured to write data stored in the tile buffer to an external memory; wherein:
- the graphics processing pipeline is configured to, when processing a set of tiles to generate an output:
- for a first tile of the set of tiles:
- render at least one render target containing data to be used in a processing operation, and storing the at least one render target in the tile buffer, each render target comprising an array of sampling position values corresponding to an array of sampling points for the tile in question;
- perform a processing operation for the tile using the stored at least one render target to generate an output for the tile; and
- store some but not all of the sampling position values for a render target or targets of the at least one render target for the tile for use when processing at least one other tile of the set of tiles; and
- for another tile of the set of tiles:
- render at least one render target containing data to be used in a processing operation and store the at least one render target in the tile buffer, each render target comprising an array of sampling position values corresponding to an array of sampling points for the tile in question; and
- perform a processing operation for the another tile using the stored at least one render target and one or more of the sampling position values from the first tile that were stored for use when processing another tile of the set of tiles to generate an output for the another tile.

The technology described herein relates to a tile-based graphics processing pipeline in which when a set of tiles is being rendered to generate an output, data rendered for a given tile is used to perform a processing operation that is then used to provide an output result for the tile. As will be discussed further below, the processing operation may, comprise, for example, a deferred shading operation, a compression operation, an image processing operation, etc.

However, in the technology described herein, as well as generating and using a render target or targets for the tile in question for the processing operation for a given tile, some but not all of the sampling position values generated for a render target or targets for one tile are stored for use when carrying out the processing operation for another, e.g., and in an embodiment, adjacent, tile. Then, when the another, e.g. adjacent, tile is to be processed, the stored sampling position values from the previous tile are used when processing that another tile. This has the effect that processing operations such as deferred shading operations, can be carried out in a tile-based graphics processing pipeline in a more bandwidth and memory efficient manner, as will be discussed further below.

In particular, the technology described herein can, for example, enable deferred shading operations to be performed in a tile-based graphics processing system without the need, for example, for storage and subsequent re-storage of all the rendered tile data. Thus the technology described herein can facilitate performing such operations with reduced external bandwidth cost, instead of writing out and reading back huge G-buffers, thereby enabling these techniques to be applied in the embedded space. This in turn can lead to increased system performance and reduced power consumption.

The Applicants have in particular recognised that some processing operations that may be applied by a graphics processing pipeline may require sampling position values that correspond to sampling positions that are, for example, adjacent to a particular sampling position. The Applicants have then further recognised that in tile-based systems some of the adjacent sampling positions for particular sampling positions (e.g. for sampling positions that are at or near the edge of a tile being processed), may in fact be in a tile that is adjacent to the particular tile being processed. The technology described herein addresses this by storing some but not all of the sampling position values generated for a given tile for use when processing another, e.g. adjacent, tile. In this way, the sampling position values needed when processing the adjacent tile are available for use by the graphics processing pipeline.

However, the Applicants have recognised that it is not necessary to store all the rendered data for a tile for use with subsequent tiles when performing processing operations such as deferred shading. Thus, by only storing some but not all of the sampling position values from a previous tile, the storing and writing out and reading back of a complete tile's data (e.g. G-buffers) is avoided. This then allows the processing operation, e.g. deferred shading, to be carried out in a more bandwidth and memory efficient manner than, e.g., simply storing all the rendered tile data for later use.

The technology described herein also extends to the operation of storing sampling position values generated for a given tile for use when processing an adjacent tile.

Thus, another embodiment of the technology described herein comprises a method of operating a tile-based graphics processing pipeline that comprises:
- a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
- a tile buffer configured to store rendered fragment data locally to the graphics processing pipeline prior to that data being written out to an external memory; and
- a write out stage configured to write data stored in the tile buffer to an external memory; the method comprising:
- the graphics processing pipeline, when processing a set of tiles to generate an output:
- for at least one tile of the set of tiles:
- rendering at least one render target containing data to be used in a processing operation, and storing the at least one render target in the tile buffer, each render target comprising an array of sampling position values corresponding to an array of sampling points for the tile in question;
- performing a processing operation for the tile using at least one of the stored at least one render targets to generate an output for the tile; and storing some but not all of the sampling position values for a render target or targets of the at least one render target for the tile for use when processing another tile of the set of tiles.

Another embodiment of the technology described herein comprises a tile-based graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory; and a write out stage configured to write data stored in the tile buffer to an external memory; wherein:

the graphics processing pipeline is configured to, when processing a set of tiles to generate an output:

for at least one tile of the set of tiles:

render at least one render target containing data to be used in a processing operation, and store the at least one render target in the tile buffer, each render target comprising an array of sampling position values corresponding to an array of sampling points for the tile in question;

perform a processing operation for the tile using at least one of the stored at least one render targets to generate an output for the tile; and store some but not all of the sampling position values for a render target or targets of the at least one render target for the tile for use when processing another tile of the set of tiles.

Correspondingly, the technology described herein also extends to the use of sampling position values stored from a previous tile when processing a tile.

Thus, another embodiment of the technology described herein comprises a method of operating a tile-based graphics processing pipeline that comprises:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory; and a write out stage configured to write data stored in the tile buffer to an external memory; the method comprising:

the graphics processing pipeline, when processing a set of tiles to generate an output:

for at least one tile of the set of tiles:

rendering at least one render target containing data to be used in a processing operation and storing the at least one render target in the tile buffer, each render target comprising an array of sampling position values corresponding to an array of sampling points for the tile in question;

reading from memory some but not all of the sampling position values from one or more render targets generated for a previously processed tile of the set of tiles; and performing a processing operation for the tile using at least one of the stored at least one render targets for the tile and the read sampling position values from one or more render targets of a previously processed tile of the set of tiles, to generate an output for the tile.

Another embodiment of the technology described herein comprises a tile-based graphics processing pipeline comprising:

a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;

a tile buffer configured to store rendered fragment data locally to the graphics processing pipeline prior to that data being written out to an external memory; and a write out stage configured to write data stored in the tile buffer to an external memory; wherein:

the graphics processing pipeline is configured to, when processing a set of tiles to generate an output:

for at least one tile of the set of tiles:

render at least one render target containing data to be used in a processing operation and store the at least one render target in the tile buffer, each render target comprising an array of sampling position values corresponding to an array of sampling points for the tile in question;

read from memory some but not all of the sampling position values from one or more render targets generated for a previously processed tile of the set of tiles; and perform a processing operation for the tile using at least one of the stored at least one render targets for the tile and the read sampling position values from one or more render targets of a previously processed tile of the set of tiles, to generate an output for the tile.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

The tile buffer will store, as is known in the art, an array or arrays of sample values for the tile in question. The tile buffer will store data values for an array of sample positions, with respective sets of the sample positions, e.g., and in an embodiment, corresponding to and being associated with respective pixels of an output data array that the rendered fragment data relates to.

These sample values are usually, and in an embodiment are, grouped into sets of sample values (such as groups of 2×2 sample values) that are each associated with a respective (e.g. display) pixel in the tile in question. The sample values may, e.g., comprise colour values (a colour buffer), depth values (a depth buffer), etc.

The write out stage (unit) operates to write the data in the tile buffer (once the data in the tile buffers is complete) out to external (main) memory (e.g. to a frame buffer), as is known in the art. This may include, as is known in the art, downsampling (averaging), either in a fixed or in a variable fashion, the sample values in the tile buffer to the final output (pixel) value to be written to the main memory (e.g. frame buffer) and/or other output, if desired.

The set of tiles that is processed in the technology described herein can be any desired and suitable set of tiles that together make up an output to be generated using the graphics processing pipeline, such as a desired render output. In one embodiment, the output is an output frame, e.g. to be displayed. In another embodiment it is a texture. The set of tiles in an embodiment includes more than two tiles, and in an embodiment more than three tiles.

The tiles can take any desired and suitable shape. However, in embodiments, the tiles are rectangular (including, and in an embodiment, square). Each tile may be W sampling positions wide (i.e. in a horizontal direction) by H sampling positions high (i.e. in a vertical direction). In embodiments, W is 16 sampling positions and/or H is 16 sampling positions. Different outputs to be generated can use different size tiles, if desired.

The operation in the manner of the technology described herein is in an embodiment performed appropriately for each tile of the set of tiles that is being processed to generate the output. Thus, in an embodiment, where the set of tiles includes four or more tiles, the technology described herein comprises (and the graphics processing pipeline is configured to), for two or more of (for a plurality of) the tiles of the set of tiles:

rendering at least one render target containing data to be used in a processing operation, and storing the at least one render target in the tile buffer;

storing some but not all of the sampling position values for a render target or targets of the at least one render target for the tile for use when processing at least one other tile of the set of tiles; and performing a processing operation for the tile using the stored at least one render target or targets and one or more stored sampling position values from at least one other tile of the set of tiles, to generate an output for the tile.

In an embodiment, this operation is performed for each tile in the set of tiles being processed, save for the first tile to be processed in the set (where there will not be any previously processed tile) and the last tile to be processed in the set (where there will not be any subsequent tile to be processed).

The another tile or tiles that some but not all of the sampling position values for a render target or targets for a tile are stored for use when processing can be any desired other tile or tiles of the set of tiles. However, in an embodiment it is an adjacent tile or tiles of the set of tiles. Thus, in an embodiment, the technology described herein comprises storing some but not all of the sampling position values for a render target or targets of the at least one render target generated for a tile for use when processing an adjacent (at least one adjacent) tile of the set of tiles. Correspondingly, the another tile of the set of tiles for which the processing operation then uses the sampling position values stored from another (e.g. the first) tile, in an embodiment comprises a tile of the set of tiles that is adjacent to the tile whose stored sampling position values are being used for the processing operation.

The render target(s) for a tile will comprise, as is known in the art, an array of sampling position values, corresponding to the sampling positions that the tile corresponds to (represents). The sampling position values may comprise, for example, one or more of: depth values, colour values (RGB values), normal values, transparency values, etc., e.g. depending on the particular processing operation being performed.

The sampling position values for a render target may be derived in any desired and suitable way. In embodiments, the sampling position values are derived by carrying out one or more rendering processes in respect of the sampling positions of the tile in question. The one or more rendering processes may comprise, for example, one or more of: texturing, fragment shading and blending.

The rendering of the input data render target(s) containing the data for the processing operation can be triggered and performed as desired, e.g. and in an embodiment, by triggering appropriate rendering operations in the normal manner for the graphics processing pipeline in question.

The number of render targets that are generated for a tile for use for the processing operation may be selected as desired, depending upon the nature of the processing operation. For certain processing operations, such as data (e.g. texture) compression or decompression, there may only be a single render target needed (e.g. containing the texture or image to be compressed or decompressed) for each tile. On the other hand, for deferred shading operations, for example, multiple render targets may be needed and generated for each tile (and accordingly some but not all of the sampling position data for each of multiple render targets will be stored for use when processing an adjacent tile). In the case of a deferred shading operation, the input data render targets may include, for example, colour data, depth data, surface normals, other attributes, etc.

Where multiple render targets are required for a tile, then those render targets are in an embodiment all generated and stored in the tile buffer simultaneously. Thus, in an embodiment the tile buffer is configured to be able to (and configurable to) store multiple render targets simultaneously.

The multiple render targets for a tile may be stored in the tile buffer in any suitable and desired manner. For example the tile buffer may be sized so as to accommodate plural colour buffers (that can each then serve to store a render target). Thus, there may be fixed allocations in the tile buffer set aside for the respective render targets. However, in an embodiment, this is done in the manner described in the Applicant's U.S. patent application Ser. No. 13/875,831, filed 2 May 2013 and entitled Graphics Processing Systems, which is incorporated herein in its entirety by reference.

Thus, in an embodiment, the tile buffer comprises an allocated amount of memory for use as the tile buffer, and the graphics processing system (that the graphics processing pipeline is a part of) comprises a memory allocator configured to determine the tile data storage requirements for each render target to be generated for a render output to be generated by the graphics processing system and operable to allocate portions of the memory allocated for use as the tile buffer to respective ones of the render targets based on the determination, with the graphics processing pipeline when generating rendered tile data for a respective render target for the render output, then storing the rendered tile data in the portion of the tile buffer allocated to that render target.

In embodiments the driver for the graphics processing pipeline performs the determination and tile buffer memory allocation (the driver is the memory allocator).

The tile buffer is in an embodiment apportioned between the different render targets by allocating different addresses within the tile buffer memory space to the render targets, and each render target in an embodiment has state information in the form of a render target descriptor associated with it that indicates the tile buffer region that data for the render target in question should be written to (that the processing stages of the graphics processing pipeline then use to determine where to store the rendered tile data for the render target in question).

The processing operation that is performed using the tile data can be any desired and suitable processing operation. In an embodiment it is one of: a deferred shading operation; a data compression or decompression operation; and an image processing operation. In an embodiment it is a deferred shading operation, such as a deferred lighting operation.

The processing operation can be performed as desired, e.g. depending upon the nature of the processing operation. For example, the graphics processing pipeline could be provided with fixed function processing hardware that carries out the processing operation (and in one embodiment this is the case).

However, in an embodiment, the graphics processing pipeline includes a programmable processing stage that is operable to (that can be programmed to) carry out the processing operation. Thus, in an embodiment, the graphics processing pipeline includes a programmable processing stage operable to, in response to one or more graphics program instructions, read data stored in the tile buffer (e.g., and in an embodiment, to read data from one or more (or two or more) render targets in the tile buffer), and from stored data values for a previously processed, e.g. adjacent, tile or tiles from memory where they are stored, and to then perform a processing operation (e.g., and in an embodiment, a deferred shading operation) using the read data.

In one embodiment, the processing operation uses one render target for a tile. In another embodiment it uses plural render targets for a tile.

The processing operation in an embodiment derives one or more than one output value for the tile. Each output value in an embodiment corresponds, respectively, to a sampling position for the tile.

In one embodiment, the processing operation derives an output array of sampling position values for the tile, e.g., and in an embodiment, corresponding to each sampling position for the tile. In another embodiment it derives a single, or only a few, output value(s) for the tile. In this case, the one or more output values in an embodiment comprise an output value or values for some, but not all, of the sampling positions of the tile in question.

The one or more output values can be derived from the sampling position values in any desired and suitable way.

In an embodiment, the processing operation uses a set (kernel) of sampling position values from a render target (or targets) to derive the (and each) output value. The set of sampling position values that is used in an embodiment comprises an array of sampling position values (e.g. a 3×3 array of sampling portion values) that includes the sampling position for which the output value is being generated. Thus, in an embodiment, the processing operation uses sampling position values from a set of (plural) sampling positions (from one or from more than one render target) to generate an output value for a given sampling position, and the sampling position for which the output value is being generated is in an embodiment one of the sampling positions in the set of sampling positions that is being used to generate the output value.

The same set (kernel) of sampling position values could be used from each render target that is to be used to derive the (and each) output value, or different sets (kernels) of sampling position values could be used from different render targets when deriving the output values (for the processing operation).

In some embodiments, the set (kernel) of sampling positions used to produce an output result for a given sampling position may surround the sampling position in question (i.e. the sampling position being processed may be at or towards the centre of the set of sampling positions (processing kernel) being used).

However, the Applicants have recognised that this may mean, for example, that some sampling positions in a tile (e.g. in the top-left corner of the tile) may need sampling position values from, e.g., one set of tiles (e.g. the adjacent tile above, the adjacent tile to the left of, and the adjacent tile above and to the left of, the particular tile), but that other sampling positions in the tile (e.g. in the bottom-right corner of the tile) may need sampling position values from a different set of, e.g., three adjacent tiles (e.g. the adjacent tile below, the adjacent tile to the right of, and the adjacent tile below and to the right of, the tile in question). This in turn may mean that sampling position values from a larger number of tiles will need to be derived and stored before a given tile can be processed.

To address this, in an embodiment the set (kernel) of sampling positions used by the processing operation to produce an output result for a given (and for each) sampling position is configured so as to constrain (reduce) the number of different, e.g. adjacent, tiles that sampling position data may be needed from when processing a given tile. In an embodiment the arrangement is such that sampling position data from no more than three other tiles will be needed when processing a given tile.

In an embodiment, this is achieved by configuring the set (kernel) of sampling positions used to produce an output result for a given sampling position (and for each sampling position that an output value is to be generated for) such that that set (kernel) of sampling positions does not surround the sampling position in question (i.e. such that the sampling position in question (that the output value is to be generated for) lies at an edge of the set (kernel) of sampling positions that is to be used to produce the output result for the sampling position in question).

In an embodiment, the processing operation is configured such that for a, and in an embodiment for each, sampling position for which an output value is to be generated, the sampling position for which the output result is to be generated lies at a corner of the set (kernel) of sampling positions to be used to produce the output result for the sampling position.

This can then mean that the processing operation for the sampling positions for any given tile will at the most need sampling position values for sampling positions from only three adjacent tiles (the tiles that are adjacent to the corner of the set (kernel) of sampling positions that is opposite to the sampling position for which the output value is being generated) (e.g. the adjacent tile above the particular tile, the adjacent tile to the left of the particular tile, and the tile above and to the left of the particular tile). This then reduces, for example, the number of tiles of the output that need to be initially processed to derive sampling position values prior to a particular tile being processed (e.g. to those tiles above and/or to the left of the particular tile).

It will be appreciated from the above that the processing operation will typically comprise, and in an embodiment does comprise, generating an output value for one or more (and in an embodiment for each) sampling position of the tile being processed. Furthermore, depending upon the number of sampling position values that are used for the processing operation for each sampling position output value to be generated, it will be appreciated that in respect of some sampling positions in the tile (e.g. interior sampling positions) the processing operation will simply use sampling position values for the tile in question, whereas for other sampling positions (e.g. exterior or edge sampling positions) in the tile, the processing operation will use both sampling position values for the tile in question and sampling position values stored from one or more other, e.g. adjacent, tiles. Thus, in an embodiment, the processing operation generates output values for plural sampling positions within the tile, and for some of those sampling positions uses only sampling position values for the tile in question, but for others of the sampling positions uses sampling position values from the tile in question and stored sampling position values from at least one other, e.g. and in an embodiment, adjacent, tile.

Where the processing operation uses sampling values from another, e.g. adjacent, tile or tiles, then the graphics processing pipeline will read (and use in the processing operation) stored sampling position values for a render target or targets for some but not all of the sampling positions of one or more other, previously processed, tiles.

The output of the processing operation (e.g. the output value or values generated for the tile) may be used in any suitable and desired manner. In an embodiment, it is stored for later use. In an embodiment, the output (result) of the processing operation for a tile is written to an output render target in the tile buffer, or to external memory. This may be appropriate where, for example, the processing operation is a deferred shading operation and the output result for a tile is accordingly a deferred shaded tile of a frame, e.g., to be displayed. Where the result of the processing operation is written out to external memory, this may be, for example, performed by the write out unit. Correspondingly, where the result of the processing operation is written to an output render target in the tile buffer, that output render target may then subsequently be written out to external memory, e.g., again by the write out unit.

As discussed above, one or more, but not all, of the render target sampling position values for at least some of the tiles in the set of tiles are retained for use when processing another, e.g. adjacent, tile. In embodiments, the retained (stored) sampling position values comprise, and in an embodiment only comprise, the sampling position values that are (at least expected to be) needed from the tile to process other tiles. Thus, in an embodiment, a selected subset of the render target sampling position values for a tile are stored for use when processing another (an adjacent) tile.

Thus, in an embodiment, the sampling position values that are stored for use when processing another, e.g. adjacent, tile or tiles are selected and determined based on the sampling position values that it is known or expected will be needed for processing another tile or tiles. This determination is in an embodiment based on the nature of the processing operation to be performed using the sampling position values (as the number of sampling position values for a tile needed when processing another tile will depend on the processing operation in question), and may be made, e.g., by analysis of instructions sent to the graphics processing system from an application that requests the processing operation to be performed (e.g., and in an embodiment, by the driver for the graphics processing pipeline).

Where, as discussed above, the processing operation uses a set (a kernel) of sampling position values to produce each output value (e.g. a 3×3 convolution kernel), then the sampling position values that are stored for use when processing another tile are in an embodiment selected based on the size (and shape) of the set (kernel) of sampling position values that the processing operation will use to produce each output value.

For example, if the set of sampling positions is X sampling positions wide (i.e. in a horizontal direction) by Y sampling positions high (i.e. in a vertical direction) (for example, X may be 3 and/or Y may be 3 such that the kernel is 3 sampling positions by 3 sampling positions), then the sampling position values that need to be stored for use with adjacent tiles are in an embodiment determined (in use) from the values of X and Y.

The values of X and Y may be different for different processing operations and for different types of sampling position value. Correspondingly, the number of sampling position values that are stored for use when processing another tile or tiles could be the same for each render target that is generated for a tile, or could differ as between respective different render targets (be different for different render targets) (and be the same for, or differ as between, respective different outputs to be generated by the graphics processing pipeline).

Thus, embodiments may comprise determining the size of the set (kernel) of sampling positions (e.g. the value of X and Y) that the processing operation will use (e.g. the number of adjacent sampling position values that will be required) from the processing operation and/or type of sampling position value that is being used to derive the output value(s). This determination may again be made by analysis of instructions sent to the graphics processing system from an application that requests the processing operation to be performed.

In embodiments, the sampling position values stored from a tile for use when processing other tiles are those sampling position values corresponding to the sampling positions in a column that is within X−1 sampling positions of the vertical side nearest to a particular corner of the tile and/or those sampling position values in a row that is within Y−1 sampling positions of the horizontal side nearest to the particular corner (e.g. within X−1 sampling positions of the right side of the adjacent tile and within Y−1 sampling positions from the bottom of the adjacent tile). Thus, in embodiments, these, and in an embodiment only these, sampling position values are stored for the, or for each, (appropriate) tile.

The Applicants have recognised that in these cases, some sampling position values may belong both to a column that is within X−1 sampling positions of the vertical side nearest to a particular corner of a tile and to a row that is within Y−1 sampling positions of the horizontal side nearest to the particular corner (e.g. the sampling position values in the bottom-right corner of a diagonally adjacent tile). In embodiments, these sampling position values are only stored once for use with another tile (i.e. each sampling position value that could be needed for an adjacent tile is only stored once for use with another tile). They may be stored, for example, in respect of the column and not the corresponding row of the tile (or vice versa). This can, for example, further reduce (i.e. by (Y−1)×(X−1) sampling position values) the amount of memory and memory bandwidth needed to store the sampling position values.

In embodiments, each column and/or row of sampling position values for a tile that is stored for use with an adjacent tile (or tiles) is stored such that it will be fetched as a separate (and distinct) memory access burst (e.g., and in an embodiment, as a separate (and distinct) cache line). This can, for example, facilitate indexing to the sampling position values in memory and fetching the values from memory.

In embodiments, where columns and rows of sampling position values are stored as respective different memory burst "units" (e.g. cache lines), then the, e.g., cache lines storing column sampling position values are in an embodiment interleaved with the cache lines storing row sampling position values (i.e. such that in order, there will be a cache line storing a column of sampling position values, then a cache line storing a row of sampling position values, then a cache line storing a column of sampling position values (and so on, if required), or vice-versa).

This can help, for example to maximise the memory burst length between any "gaps" in the stored sampling position values due to duplicated row and column values not being stored twice, and reduce the number of individual memory bursts needed to write the retained sampling position values.

In some embodiments, the number of sampling position values needed from adjacent tiles may be the same for each particular tile to be processed, and can, e.g., be determined from the values of X and Y as discussed above. Thus, in an embodiment, the same number of sampling position values is stored for use with an adjacent tile (or tiles) for each tile in question.

However, in other embodiments (e.g. where the processing operation does not necessarily process each sampling position within a tile), the number of sampling position values needed from adjacent tiles may be different for different tiles (e.g. for each particular tile to be processed). In these embodiments, the worst case number of sampling position values, e.g. determined from the values of X and Y as discussed above, could still be retained from each tile.

However, in an embodiment of these arrangements, different numbers of sampling position values are stored for use with an adjacent tile (or tiles) for different tiles in the set of tiles (i.e. the number of sampling position values stored for use with an adjacent tile (or tiles) can, and in an embodiment does, differ as between tiles in the set of tiles). In this case, which sampling position values are needed for each adjacent tile are in an embodiment derived for each respective tile to be processed.

In an embodiment, the sampling position values from the previous tile needed for the $i^{th}$ tile in the horizontal direction (where i=0, 1, 2 . . . ) (i.e. the number of sampling position values that must be retrieved from the previous tile for processing the $i^{th}$ tile), for a processing kernel which is X by Y sampling positions in size and for tiles which are W by H sampling positions in size, and for which the processing kernel generates an output value for a sampling position lying at a corner of the processing kernel, are those sampling position values corresponding to the sampling positions of a column that is within $N_i$ sampling positions of the vertical side nearest to the corner of the processing kernel that the output value is being generated for given by:

$N_i$=iW mod X

Correspondingly, the sampling position values to be stored for the $i^{th}$ tile for use when processing the next tile in the horizontal direction are those sampling position values corresponding to the sampling positions of a column that is within $N_i$ sampling positions of the vertical side nearest to the corner of the processing kernel that the output value is being generated for given by:

$N_i$=(i+1)W mod X

Similarly, the sampling position values from the previous tile needed for the $j^{th}$ tile in the vertical direction (where j=0, 1, 2 . . . ) (i.e. the number of sampling position values that must be retrieved from the previous tile for processing the $j^{th}$ tile), for a kernel which is X by Y in size and for tiles which are W by H in size, and for which the processing kernel generates an output value for a sampling position lying at a corner of the processing kernel, are those sampling position values corresponding to the sampling positions of a row within $M_j$ sampling positions of the horizontal side nearest to the corner of the processing kernel that the output value is being generated for given by:

$M_j$=jH mod Y

Correspondingly, the sampling position values to be stored for the $j^{th}$ tile for use when processing the next tile in the vertical direction are those sampling position values corresponding to the sampling positions of a column that is within $M_j$ sampling positions of the horizontal side nearest to the corner of the processing kernel that the output value is being generated for given by:

$M_j$=(j+1)H mod Y

In an embodiment, the values for $N_i$ and $M_j$, and then the sampling position values to store for use with other tile(s), are determined in the above manner.

The sampling position data that is stored for use when processing another, e.g. adjacent, tile or tiles can be stored as desired. In an embodiment, it is stored in local (on-chip) memory of the graphics processing pipeline, in an embodiment a local cache of the graphics processing pipeline, such as, and in an embodiment the tile buffer. This sampling position data may be stored in the, e.g., tile buffer, in any suitable and desired manner. For example the tile buffer may be sized so as to accommodate it, e.g. there may be fixed allocations in the tile buffer set aside for the respective sampling position data, or, e.g., and in an embodiment, this may be done in the manner described in the Applicant's earlier U.S. patent application Ser. No. 13/875,831.

The sampling position data may also or instead be stored in external memory (main memory) accessible to the graphics processing pipeline, e.g. of the host system that the graphics processing pipeline is associated with. This may be appropriate where the local (on-chip) memory may not have capacity for the sampling position data. In an embodiment, it is stored in a suitable cache memory associated with and accessible to the graphics processing pipeline, backed by main memory accessible to the graphics processing pipeline.

In an embodiment, the retained sampling position data is preferentially stored in a local (on-chip) memory of the graphics processing pipeline, such as the tile buffer, but is stored in external memory, if required.

The storing of this sampling position data can be facilitated as desired, e.g. via explicit hardware support for this process, or by including appropriate graphics processing instructions, for example by the shader compiler, in the set of graphics processing instructions that are provided to the graphics processing pipeline.

The sampling position data that is stored for use when processing another, e.g. adjacent, tile or tiles should be stored (retained) until all the other tiles that it could be needed for have been processed (at which point, it may, e.g., and in an embodiment, be allowed to be overwritten). The period to retain the stored sampling position data for use when processing another tile or tiles can be determined as desired, for example, and in an embodiment, based on the processing operation in question (which will determine how many other tiles the stored sampling position data is required for), and knowledge of the processing order of the tiles or, e.g., an indication of when the relevant other, e.g. adjacent, tiles have been processed. This will then help to ensure that the sampling position data that is stored for use when processing another tile or tiles is not retained for longer than it is needed, thereby, for example, reducing the amount of memory required for storing that data.

The graphics processing pipeline can read the sampling position data that is stored for use when processing another, e.g. adjacent, tile in any desired and suitable manner, e.g. depending upon the nature of the graphics processing system in question and the memory the sampling position data has been stored in. For example, the graphics processing pipeline could be provided with explicit hardware support for the reading process, or appropriate graphics program instructions could be included in the set of graphics processing instructions provided to the graphics processing pipeline, e.g. by the shader compiler. The arrangement is in an embodiment such that operations for the processing operation that would read outside the edge of the current tile are appropriately redirected to the appropriate locations in memory where the saved values from a previously processed, e.g. adjacent, tile or tiles are stored.

In an embodiment, the reading process comprises the graphics processing pipeline determining, prior to reading the stored sampling position data from another tile from the memory where it is (expected to be) stored, determining whether or not the another tile's sampling position data is still present in the tile buffer, and if that sampling position data is still present in the tile buffer, reading the required sampling position data from the tile buffer rather than from the memory where it is expected to be stored, but if the sampling position data that would be read from the memory is not still in the tile buffer, then reading the sampling position data from the memory where it is expected to be stored.

This allows for the possibility that the sampling position data from another tile may still be present in the tile buffer, and so that data can then be used from the tile buffer when processing the another, e.g. adjacent, tile, thereby again saving on memory bandwidth. This may be particularly appropriate in a graphics processing pipeline where multiple tiles may be in flight at any one time.

It will be appreciated from the above, that depending upon the nature of the processing operation, the processing operation for a given tile (or at least for certain output values (sampling positions) for a tile) may require sampling position values from more than one other, e.g. adjacent, tile.

Thus in an embodiment, the step of performing a processing operation using sampling position values for the tile in question and for sampling positions of another, e.g. adjacent tile, comprises performing the processing operation using sampling position values for the tile in question and sampling position values from a plurality of other, e.g., and in an embodiment, adjacent, tiles.

Similarly, in an embodiment, the processing operation, at least for certain output values (sampling positions) for a tile, uses sampling position values from more than one (from plural) other e.g. adjacent, tiles. In this case, the arrangement is in an embodiment such that the processing operation will never require sampling position values from more than three other, e.g. adjacent, tiles.

Correspondingly, in an embodiment, some but not all of the sampling position values for a render target or targets for a tile are stored for use when processing two or more other, e.g., and in an embodiment, adjacent, tiles of the set of tiles, and the memory that is storing the sampling position values for a render target or targets for a tile for use when processing another tile or tiles of the set of tiles in an embodiment stores some but not all of the sampling position values for a render target or targets for a plurality of tiles in the set of tiles for use when processing other tiles of the set of tiles.

Thus, in embodiments, one or more, but not all, sampling position values of a first other, e.g. adjacent, tile, one or more, but not all, sampling position values of a second other, e.g. adjacent, tile, and one or more, but not all, sampling position values of a third other, e.g. adjacent, tile, will be stored (retained) for use when processing a given tile.

Correspondingly, when determining whether and how long to retain sampling position values for a tile for use when processing other tiles for, that process should, and in an embodiment does, take into account the possibility of whether the sampling position values for the tile will be required for only one or for more than one other tile.

In an embodiment, the tiles making up the output being processed (e.g. frame for display, texture in a render-to-texture operation, etc.) are processed in a selected, particular, in an embodiment predetermined, order. The tile processing order is in an embodiment such that the sampling position values needed from each other, e.g. adjacent, tile will be available when processing a given tile (at least once the necessary initial tiles (if any) have been processed).

In other words, the tiles in the set of tiles are in an embodiment processed in an order that facilitates the sampling position values needed from the another, e.g. adjacent, tile or tiles for a given tile being available when that given tile is to be processed. Thus the tiles are in an embodiment processed in an order such that the tiles whose sampling position values will be needed when processing a given tile are processed before that given tile.

The tile processing order is in an embodiment also such that the period for which the tiles' sampling position data may need to be retained for use when processing other tiles is reduced and/or minimised.

In embodiments, as discussed above, this is facilitated by the particular output value sampling position for each processing "kernel" being at a (and the same) corner (e.g. the bottom-right corner) of the set of sampling positions that the kernel uses. As discussed above, this can then mean that each particular sampling position will at the most need sampling position values for sampling positions from only the three adjacent tiles that are adjacent to the opposite corner of the kernel. In this case, the tiles may then be, and in an embodiment are, processed in a general direction that is towards the corner of the kernel that the output value sampling position for each processing "kernel" lies at (and/or away from the opposite corner of the kernel), e.g. downwards and towards the right. This can ensure, for example, that the necessary adjacent tiles have already been processed prior to each particular tile being processed.

In embodiments, particularly when the subregions are being processed by a single processing core, the subregions are processed in raster order (e.g. by processing subregions along each row to the right, and then moving on to the next row down), in Z (Morton) order, in transposed raster order (e.g. by processing subregions along each column, and then moving on to the next column to the right), or in transposed Z (Morton) order.

Where the graphics processing pipeline comprises multiple graphics processing cores, and the set of tiles being processed is being processed by multiple graphics processing cores (i.e. distributed across multiple graphics processing cores for processing), then the tiles are in an embodiment processed by assigning rows (or columns) of the tiles to the processing cores in order, e.g. by assigning a first row (or column) of tiles to a first processing core, a second row (or column) of the tiles to a second processing core, a third row (or column) of the tiles to the first processing core, a fourth row (or column) of the tiles to the second processing core and so on. This sequence may be extended to more than two processing cores.

In embodiments, the processing of the first row (or column) of tiles is configured such that the processing of that row (or column) of tiles is always one or more tiles ahead of the processing of the second row (or column) of tiles which will in turn be one or more tiles ahead of the processing of the third row (or column) of tiles, and so on. This can ensure, for example, that tiles being processed by one core whose render target(s) values are needed by another processing core will have already been processed by the one core prior to the particular tile that needs them.

The above arrangements may be implemented as desired, e.g. by using a "job manager" that allocates the tiles to the processing core or cores in an appropriate order. The job manager may, e.g., implement an interlock to avoid a processing core that is processing a row (or column) of tiles that is further down the processing order from catching up with and/or overtaking a processing core that is processing a row (or column) of tiles that is further up the processing order.

As discussed above, in some embodiments, the output of the processing operation (the one or more output values) are written to an output buffer in external (main) memory. However, other embodiments comprise instead storing the output (the one or more output values) for use as an input value or values for another, e.g. a next, tile of the set of tiles to be processed. This can allow, for example, for an aggregation process to be carried out over a number of tiles. In this case the output (the one or more output values) for a tile could, e.g., be written to a cache memory for such use.

In these arrangements, the aggregation process may comprise, for example, a summing process that adds sampling position values corresponding to sampling positions of the tiles and/or a counting process that counts sampling positions which have a particular value or values (e.g. above or below a given threshold value) (e.g. for histogram generation, summed area tables, and/or infinite impulse responses).

Thus, some embodiments comprise deriving one or more output values for a tile by an aggregation process, storing the one or more output values, e.g. in a cache, as one or more sampling point values for the particular tile, and using the one or more sampling point values for the particular tiles when processing another tile to be processed.

As discussed above, in the technology described herein, only some but not all of the sampling position values from a render target or targets for a tile are stored for use with another tile or tiles. The process should, and in an embodiment does, operate to otherwise not write out any of the other, initial, data render targets for a tile from the tile buffer. This writing out of the remainder of the initial, input data render target or targets for a tile from the tile buffer can be prevented as desired. In an embodiment, fixed function write out of the render targets is prevented.

Such preventing of the fixed function write out of the render targets could be performed on a static basis (i.e. predetermined to statically have write out disabled), or it could be preventable on a dynamic basis (in use). In an embodiment, the programmable processing stage operates to disable and prevent the fixed function write out of the input data set of render targets to external memory.

As will be appreciated by those skilled in the art, the processing in the manner of the technology described herein may be repeated for each overall output, e.g. frame, to be generated.

The technology described herein can be used for all suitable forms of input and output that a graphics processing pipeline may be used to process and/or generate, such as frames for display, render-to-texture outputs, etc.

In some embodiments, the graphics processing pipeline comprises, and/or is in communication with, one or more memories and/or memory devices that store the data described herein, such as the sampling position values, output values etc., and/or store software for performing the processes described herein. The graphics processing pipeline may also be in communication with a host microprocessor, and/or with a display for displaying images based on the data generated by the graphics processor.

In an embodiment, the graphics processing pipeline is part of a graphics processing (data processing) system that includes, as well as the graphics processing pipeline, a host microprocessor and appropriate main memory, etc., with the host microprocessor, e.g., executing a driver for the graphics processing pipeline.

The graphics processing pipeline may also contain any other suitable and desired processing stages that a graphics processing pipeline may contain such as an early depth (or an early depth and stencil) tester, a late depth (or depth and stencil) tester, a blender, etc.

In an embodiment, the various functions of the technology described herein are carried out on a single graphics processing platform that generates and outputs the output values that are, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry, and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, if desired.

Thus the technology described herein extends to a graphics processor and to a graphics processing platform including the apparatus of or operated in accordance with any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus in a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

The technology described herein is directed to tile-based graphics processing pipelines, i.e. in which the graphics processing pipeline is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows an exemplary array 100 of sampling positions 104 used to sample a frame to be displayed. In the present embodiment, each sampling position 104 corresponds to a pixel of the display, although other mappings between the sampling positions 104 and pixels of the display could be used.

In this embodiment, the array 100 is divided into nine tiles (subregions) 102, with each tile 102 comprising sixty-four of the sampling positions 104. Each of the tiles 102 will be processed individually by a graphics processing core. The processing may, e.g. comprise rendering each sampling position 104 to derive sampling position values (depth, colours and transparency) for that sampling position 104. The generated sampling position values for a given tile 102 are stored in a tile buffer, as is known in the art.

As will be discussed below, in the present embodiment, the sampling position values for a tile are then used in a processing operation, such as shading, data compression or data aggregation, to produce an output value or values for the tile.

Figure 2A:
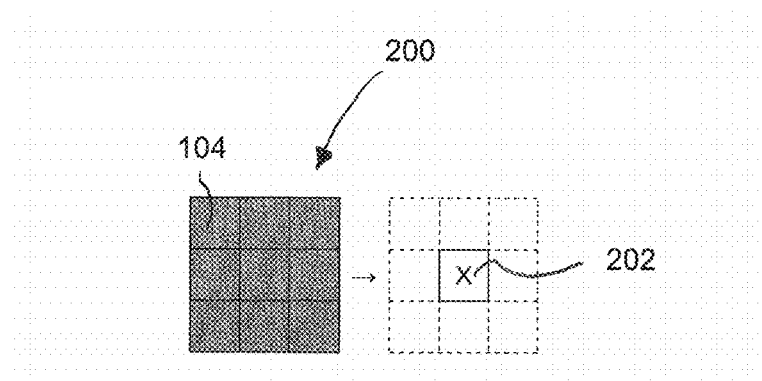
FIGS. 2A and 2B show kernels used for deferred processing of sampling position values according to embodiments of the technology described herein.

FIG. 2A shows an exemplary set (kernel) 200 of sampling positions 104 that could be used to perform a processing operation using the sample position values. The kernel 200 is X sampling positions in the horizontal direction by Y sampling positions in the vertical direction. In the present embodiment, it is assumed that the kernel 200 is a 3×3 convolution kernel and so X is 3 and Y is 3. Thus, each "application" of the kernel 200 would use the sampling position values for nine of the sampling positions 104 of the array of sampling positions 100 shown in FIG. 1 to derive an output value x for a sampling position at the centre 202 of the kernel 200.

Figure 2B:
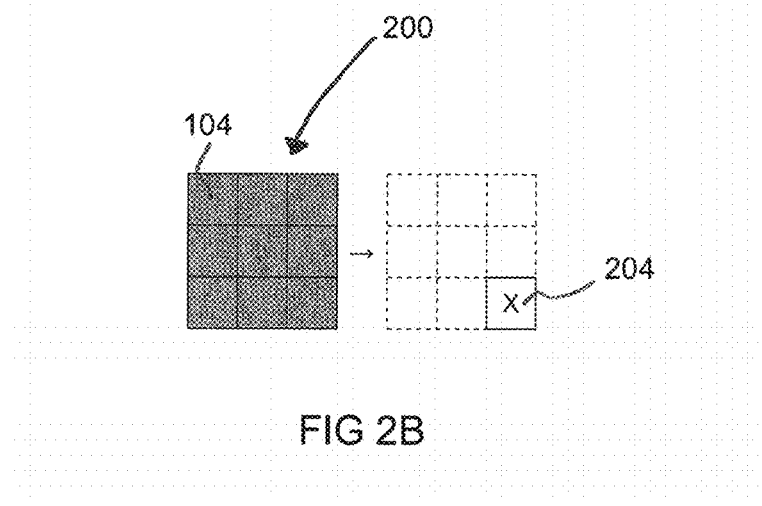

FIG. 2B shows another kernel 200 of sampling positions 104 that is used when performing processing operations according to more embodiments of the technology described herein. The kernel 200 again uses nine sampling positions 104 of the array of sampling positions 100 shown in FIG. 1. However, in this embodiment, the processing operation uses the sampling position values for the nine sampling positions 104 to derive an output value x for a sampling position at the corner 204 of the kernel 200. The advantages of this particular embodiment over that which is shown in FIG. 2A will be discussed below.

Figure 3:
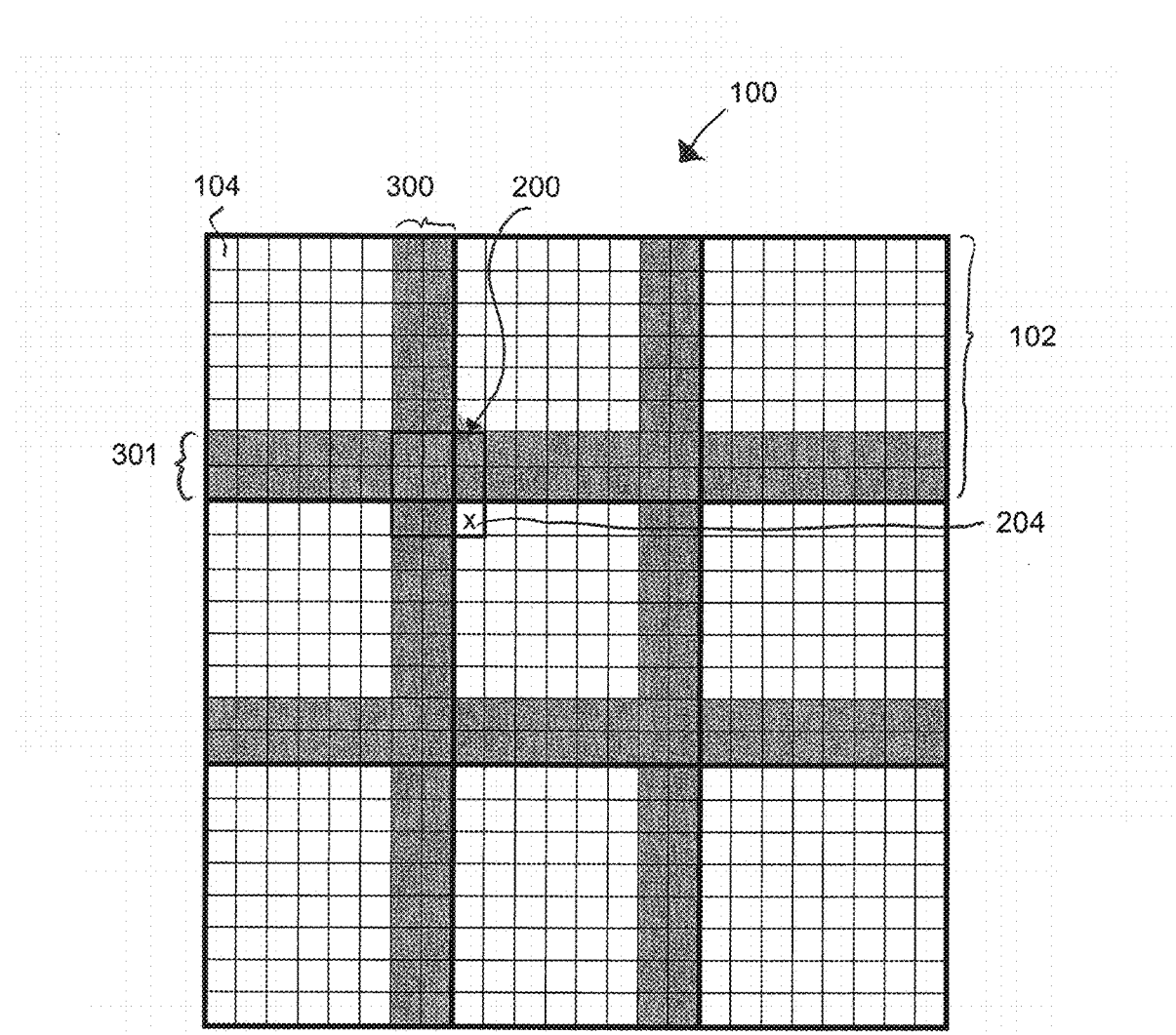
FIG. 3 shows the kernel of FIG. 2B applied to an array of sampling positions in accordance with an embodiment of the technology described herein.

FIG. 3 shows the kernel 200 of FIG. 2B when applied to the array 100 of sampling positions 104. In this embodiment, the kernel 200 is repeatedly applied such that its corner 204 overlies each of the sampling positions in the array 100. The applications of the kernel in this embodiment will therefore overlap one another. Thus, an output is derived for each of the sampling positions 104 in the array 100.

In this embodiment, the processing operation that is applied to each kernel 200 is a deferred shading process using the sampling position values corresponding to the sampling positions 104 of that kernel 200.

In FIG. 3, the kernel 200 is shown when deriving an output value for a particular sampling position within a particular tile (the centre tile). As can be seen from FIG. 3, in this position, the kernel 200 uses a sampling position value that corresponds to a sampling position in the particular tile but also uses sampling position values that correspond to sampling positions in three adjacent tiles (i.e. the adjacent tile above the particular tile, the adjacent tile to the left of the particular tile, and the adjacent tile above and to the left of the particular tile).

The sampling position values that are used when processing other tiles are shown in grey in FIG. 3. These sampling positions form columns 300 which are Y−1, i.e. two, sampling positions wide, and rows 301 which are X−1, i.e. two, sampling positions wide, in each tile 102. These sampling positions are identified in use, and the sampling position values for these sampling positions are stored in a cache memory when processing the tiles in question so that they are available when processing the respective adjacent tile(s).

(It will be appreciated from FIG. 3 that when the kernel 200 is applied at the edges of the array 100, there may not be sampling position values for every position within the kernel. This can be addressed using whatever mechanism is provided to deal with such edges in the processing operation (the use of the technology described herein does not affect this).)

Figure 4A:
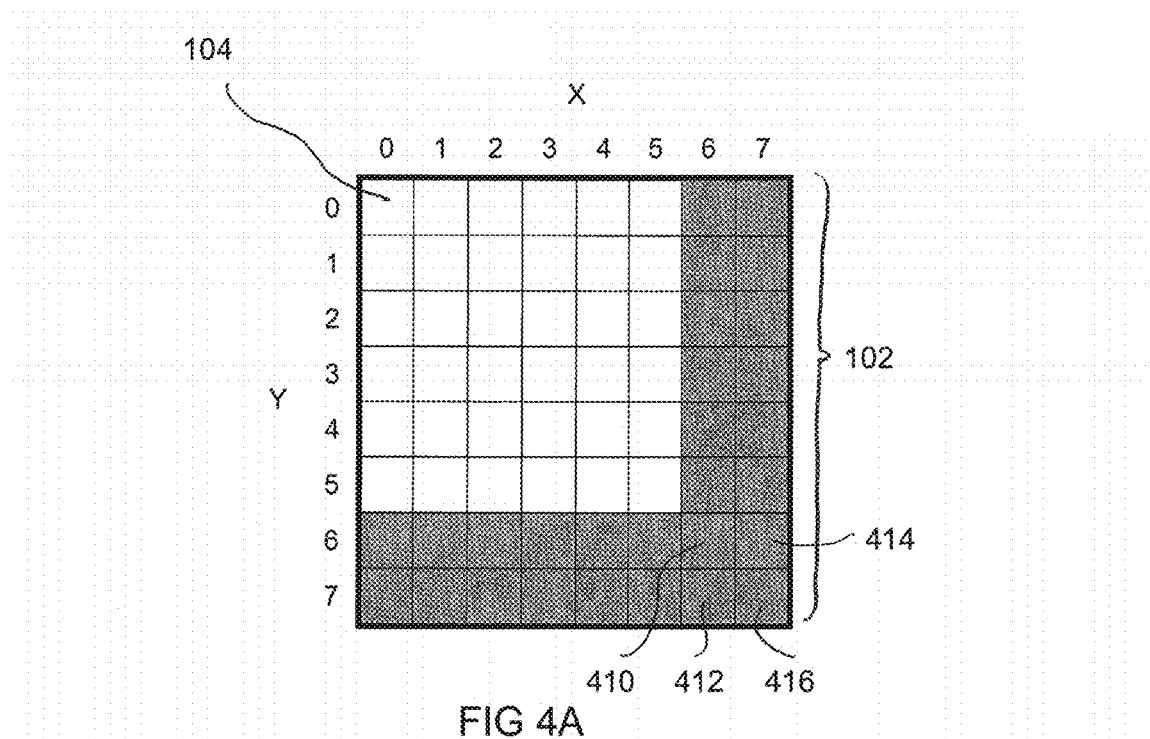
FIGS. 4A and 4B show a memory cache storage arrangement for sampling position values according to an embodiment of the technology described herein.
Figure 4B:
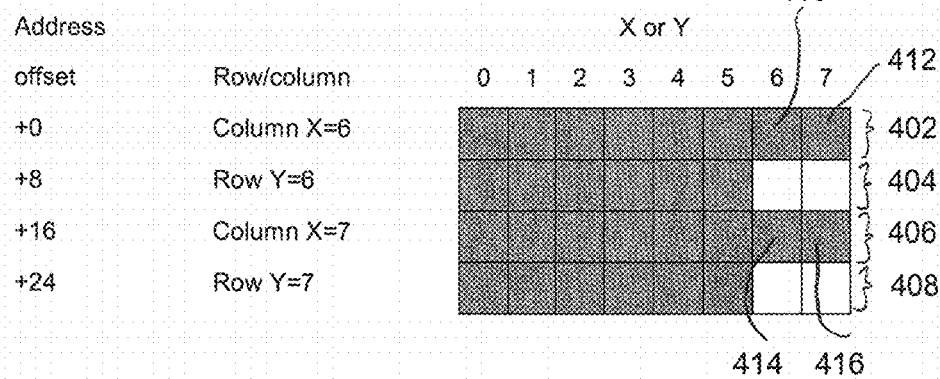

FIGS. 4A and 4B illustrate a cache memory storage arrangement for the tile sampling position values that need to be retained so that they are available when processing the respective adjacent tile(s) shown in FIG. 3. FIG. 4A shows an exemplary tile such as the tile in the top left corner of FIG. 3. The sampling position values which are stored in the cache memory are again shown in grey. FIG. 4B then shows how the sampling position values are stored in the cache memory 400. Each column and row of sampling position values is stored in a separate cache line 402, 404, 406, 408 of the cache 400. In particular, column x=6 is stored in cache line 402, row y=6 is stored in cache line 404, column x=7 is stored in cache line 406, and row y=7 is stored in cache line 408.

As can be seen from FIG. 4A, some sampling position values 410, 412, 414, 416 are part of both a column and a row of sampling position values to be stored. In this embodiment, to reduce the amount of data which needs to be stored, these sampling position values are stored only once, i.e. they are stored in respect of their column and not their row. In particular, the sampling position values for sampling positions 410 and 412 are only stored in cache line 402 for column x=6, and the sampling position values for sampling positions 414 and 416 are only stored in cache line 406 for column x=7. It should be noted that the "gaps" in the cache 400 are in alternate cache lines. This maximises the size and minimises the number of memory bursts needed when reading and writing to the cache memory 400.

Figure 5:
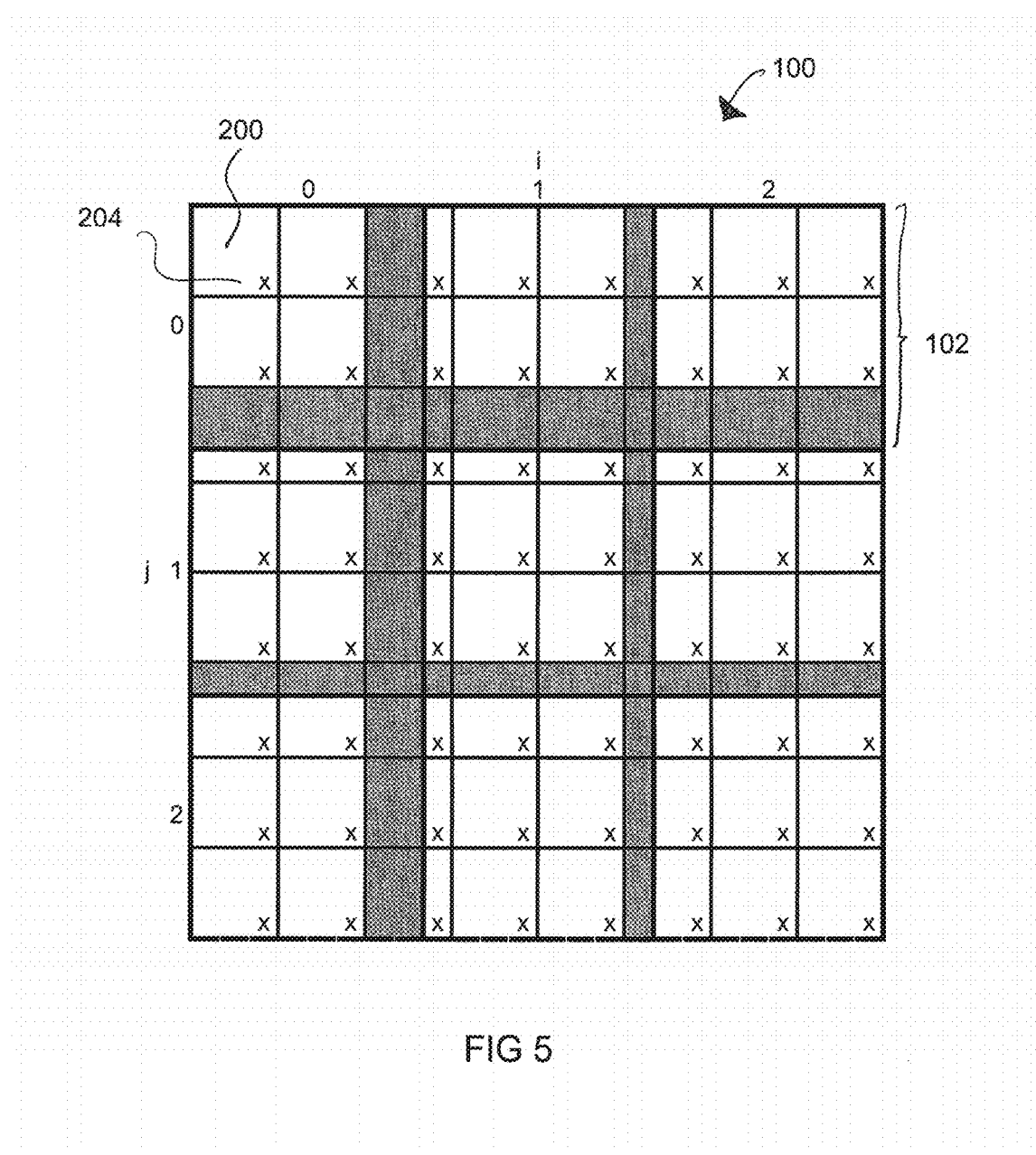
FIG. 5 shows the kernel of FIG. 2B repeatedly applied to an array of sampling positions according to another embodiment of the technology described herein.

FIG. 5 shows the kernel 200 of FIG. 2B when applied to the array 100 in accordance with another embodiment. For clarity reasons, the sampling positions 104 are not shown in FIG. 5. In this embodiment, the kernel 200 is repeatedly applied such that the applications of the kernels do not overlap one another. Thus, the corner 204 of the kernel 200 only overlies some of the sampling positions in the array 100, and an output is only derived for some of the sampling positions 104 in the array 100. In FIG. 5, the kernel 200 is shown in each and every one of its positions.

In this embodiment, the processing operation that is applied using each kernel 200 is a resolving or compression process using the sampling position values corresponding to the sampling positions 104 of that kernel 200.

As can be seen from FIG. 5, in some positions, the kernel 200 may again use sampling position values that correspond to a sampling position in a particular tile but may also use sampling position values that correspond to sampling positions in (up to) three adjacent tiles. However, the number of sampling position values needed from adjacent tiles is not the same for each of the tiles. In particular, the tiles in the central column i=1 need sampling position values from two columns of sampling positions from the left column i=0 whereas the tiles in the right column i=2 need sampling position values from only one column of sampling positions from the central column i=1.

The sampling position values from the previous tile needed for an $i^{th}$ tile in the horizontal direction (where i=0, 1, 2 . . . ) (i.e. the number of sampling position values that must be retrieved from the previous tile for processing the $i^{th}$ tile), for a processing kernel which is X by Y sampling positions in size and for tiles which are W by H sampling positions in size, and for which the processing kernel generates an output value for a sampling position lying at a corner of the processing kernel, are those sampling position values corresponding to the sampling positions of a column that is within Ni sampling positions of the vertical side nearest to the corner of the processing kernel that the output value is being generated for given by:

$$N_i = iW \bmod X$$

Correspondingly, the sampling position values to be stored for the ith tile for use when processing the next tile in the horizontal direction are those sampling position values corresponding to the sampling positions of a column that is within Ni sampling positions of the vertical side nearest to the corner of the processing kernel that the output value is being generated for given by:

$$N_j = (i+1)W \bmod X$$

Similarly, the sampling position values from the previous tile needed for a $j^{th}$ tile in the vertical direction (where j=0, 1, 2 . . . ) (i.e. the number of sampling position values that must be retrieved from the previous tile for processing the $j^{th}$ tile), for a kernel which is X by Y in size and for tiles which are W by H in size, and for which the processing kernel generates an output value for a sampling position lying at a corner of the processing kernel, are those sampling position values corresponding to the sampling positions of a row within Mj sampling positions of the horizontal side nearest to the corner of the processing kernel that the output value is being generated for given by:

$$M_j = jH \bmod Y$$

Correspondingly, the sampling position values to be stored for the $j^{th}$ tile for use when processing the next tile in the vertical direction are those sampling position values corresponding to the sampling positions of a column that is within $M_j$ sampling positions of the horizontal side nearest to the corner of the processing kernel that the output value is being generated for given by:

$$M_j = (j+1)H \bmod Y$$

Thus, in this embodiment, the sampling position values which need to be stored in the memory cache for each tile can again be determined in use.

Figure 6:
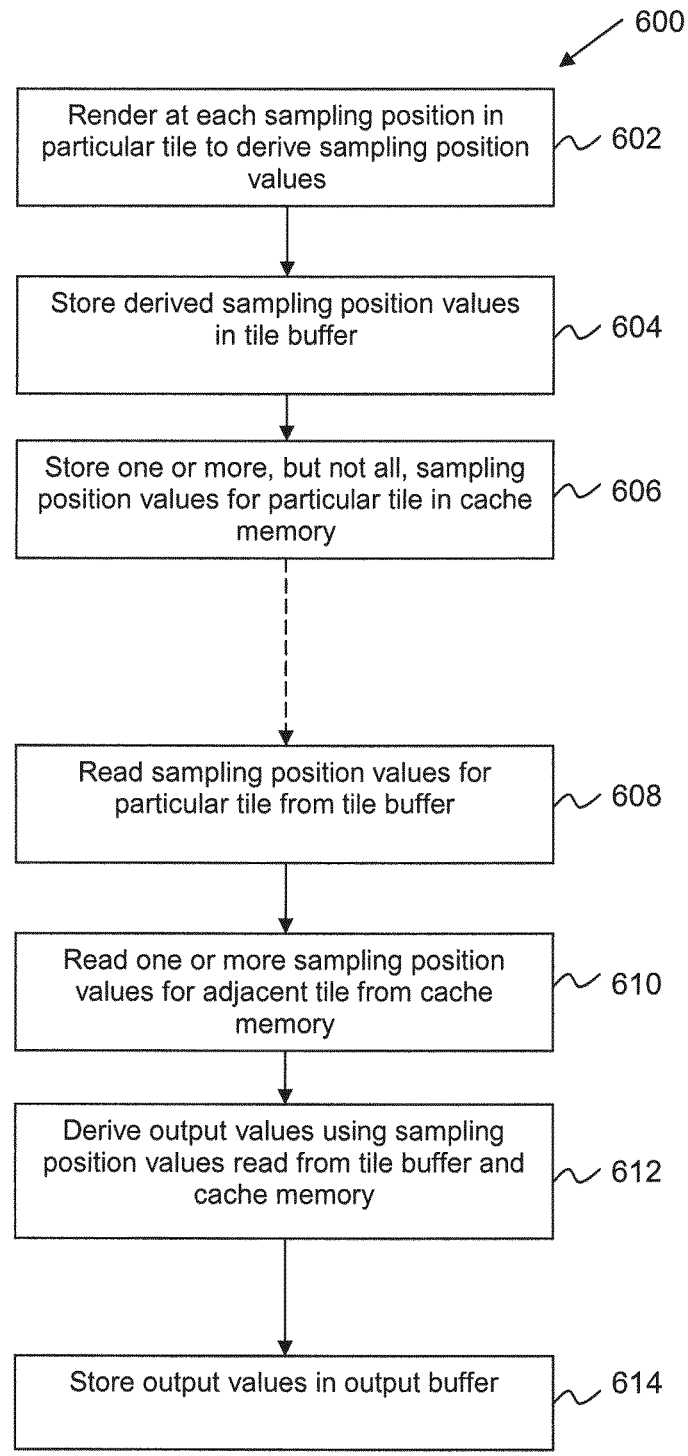
FIG. 6 shows a flow chart for processing a particular subregion of an array of sampling positions in accordance with an embodiment of the technology described herein.

FIG. 6 is a flow chart 600 that summarises operation of the above embodiments when processing a particular tile (e.g. the centre tile) of the array 100.

In step 602, as discussed above, initial rendering is performed in respect of each sampling position 104 in the particular tile 102 of the array 100 in order to derive sampling position values (e.g. depth, colours and transparency) for each of the sampling positions 104. In step 604, the sampling position values for the sampling positions 104 are stored in a tile buffer. In step 606, one or more, but not all, of the sampling position values for the tile (e.g. in the above example, the sampling position values in the column 300 and the row 301 for the tile) are stored in a cache memory (this may be part of the tile buffer or a different cache memory local to (of) the graphics processing pipeline).

In step 608, 610 and 612, as discussed above, a processing operation (e.g. shading, resolving, compression, etc.) is performed by reading sampling position values for the particular tile from the tile buffer, reading one or more sampling position values for an adjacent tile from the cache memory, and deriving one or more output values (e.g. a shaded, resolved or compressed value) using the sampling position values. In step 614, the one or more output values are stored in an output buffer, such as a frame buffer for a display.

Figure 7:
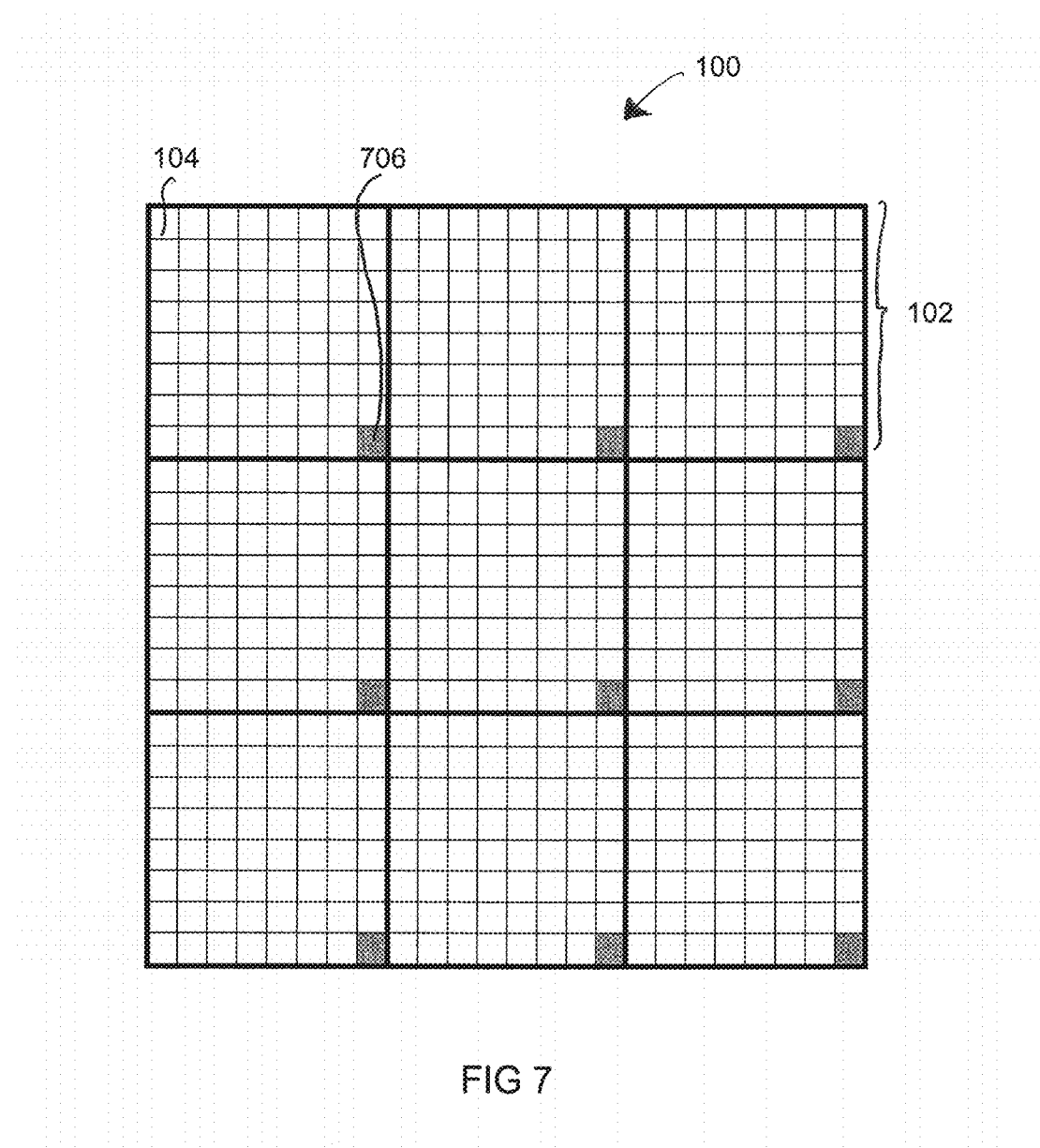
FIG. 7 shows an array of sampling positions according to another embodiment of the technology described herein.

FIG. 7 illustrates an alternative embodiment in which one or more output values are stored in the cache memory rather than the output buffer. In this embodiment, initial rendering is again performed in respect of each sampling position 104 of a given tile 102 of the array 100 in order to derive sampling position values (e.g. depth, colours and transparency) for each of the sampling positions 104 of that tile 102 prior to a processing operation being performed. However, in this embodiment, the processing operation is an aggregation process.

In this particular embodiment, the aggregation process comprises counting the number of sampling positions of the tile in question that have a brightness indicated by their sampling position value that is above a predetermined threshold to derive an output value (i.e. a count) for the tile in question. The output value (i.e. the count) is then stored in the memory cache as the sampling position value for one of the sampling positions (e.g. sampling position 706) of the tile 102. The sampling positions for which the output value is stored as a sampling position value are shown in grey for each of the tiles of the array. When processing a subsequent tile, the sampling position value from the previous tile (i.e. the count) is included in the counting for the subsequent tile. This process is then repeated for each subsequent tile, such that a count across all tiles is derived.

Figure 8:
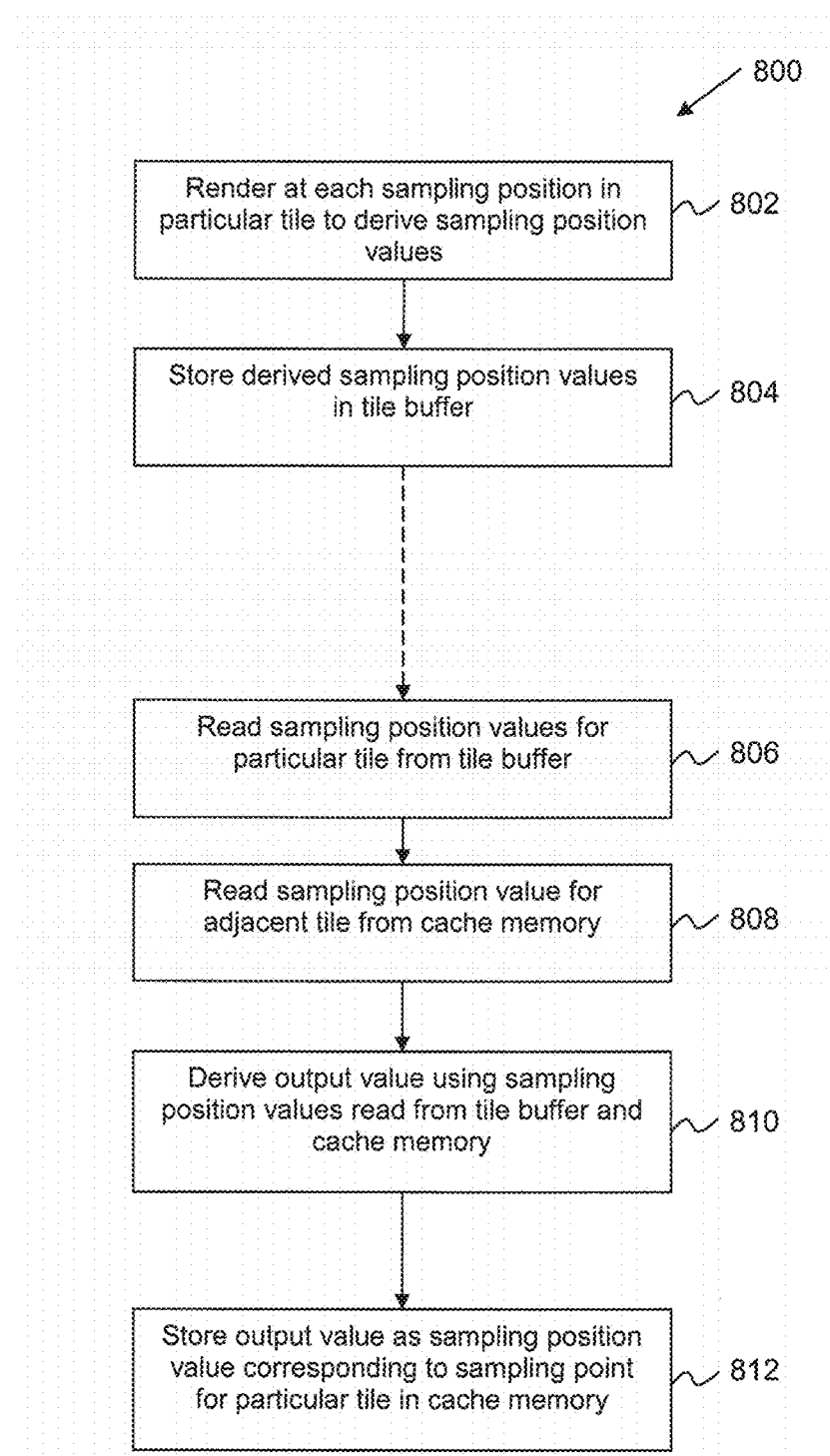
FIG. 8 shows a flow chart for processing a particular subregion of an array of sampling positions according to another embodiment of the technology described herein.

FIG. 8 shows a flow chart 800 that summarises operation of the above alternative embodiment when processing a particular tile (e.g. the centre tile) of the array 100.

In step 802, as discussed above, initial rendering is performed in respect of each sampling position 104 of the particular tile 102 in order to derive sampling position values (depth, colours and transparency) for each of the sampling positions 104. In step 804, the sampling position values for the sampling positions 104 are stored in the tile buffer.

In steps 806, 808 and 810, as discussed above, a processing operation (e.g. a count) is performed by reading sampling position values for the particular tile from the tile buffer, reading a sampling position value for an adjacent tile (e.g. a count for an adjacent tile) from the cache memory (as discussed above, this could be the tile buffer or another cache memory), and deriving an output value (e.g. a count for the particular tile) using the sampling position values. In step 812, the output value (e.g. the count for the particular tile) is stored in the cache memory for use with a subsequent tile.

Returning now to the kernels of FIGS. 2A and 2B, the kernels of both FIG. 2A and FIG. 2B can be used in embodiments of the technology described herein. However, as discussed above, the kernel of FIG. 2B has advantages over that of FIG. 2A. These advantages will be explained with reference to FIGS. 9A to 9C.

When using the kernel of FIG. 2A to process a particular tile (e.g. the centre tile), sampling position values that correspond to sampling positions of all the surrounding tiles may be required. To address this, all of the surrounding tiles can be initially processed to derive sampling position values before the processing operation is carried out in respect of the particular tile. However, when using the kernel of FIG. 2B to process a particular tile, only the sampling position values that correspond to sampling positions from adjacent tiles above and/or to the left are required. This means that the processing operation for a particular tile can be carried out once all the tiles above and/or to the left of the particular tile have been processed to derive sampling position values, i.e. there is no need to wait unit the tiles below and/or to the right of the particular tile have been processed to derive sampling position values. Using the kernel of FIG. 2B can, therefore, lead to a more flexible and efficient arrangement.

Figure 9A:
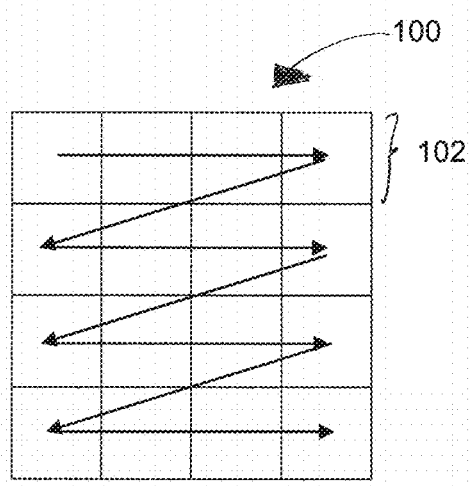
FIGS. 9A-9C show processing orders for subregions of an array of sampling positions according to embodiments of the technology described herein.
Figure 9B:
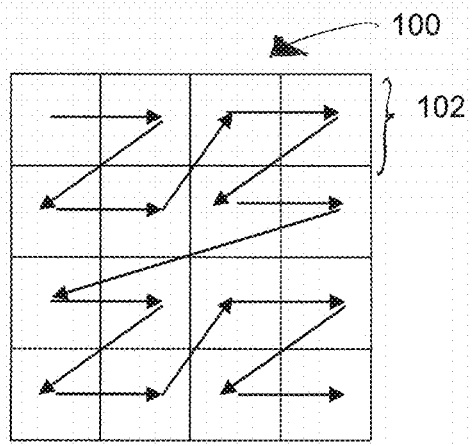
Figure 9C:
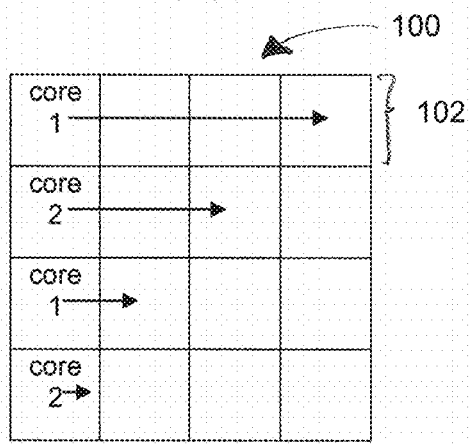

FIGS. 9A to 9C show tile processing orders that can be used when using the kernel of FIG. 2B. Each of these tile processing orders ensures that tiles that are above and/or to the left of each particular tile have been processed prior to processing the particular tile. In these embodiments, the tile processing orders are implemented by a job manager which allocates tiles to processing cores for processing.

FIG. 9A shows a raster order for processing the tiles 102 in which each tile 102 is processed by the same single processing core. In this embodiment, the tiles 102 are processed along each row from left to right before moving on to the next row down.

FIG. 9B shows a Z order for processing the tiles 102 in which each tile 102 is again processed by the same single processing core. In this embodiment, a block of four tiles is processed starting in the top-left corner, moving to the right, then diagonally down and to the left, and then to the right. This pattern is then repeated, as necessary, for additional blocks of four tiles and on a larger scale (e.g. for four blocks of four tiles, etc.).

FIG. 9C shows an order for processing the tiles in which the tiles are processed by multiple processing cores. In this embodiment, each core is allocated a row of tiles, and the tiles of that row are processed from left to right by the processing core. In this embodiment, a first processing core (core 1) begins processing its row before a second processing core (core 2) begins processing its row, and so on. The processing cores are prevented from catching up with the processing core for the row above, e.g. by an interlock in the job manager. This ensures that the tiles that are above and/or to the left of each particular tile have been processed by a core prior to processing the particular tile.

Figure 10:
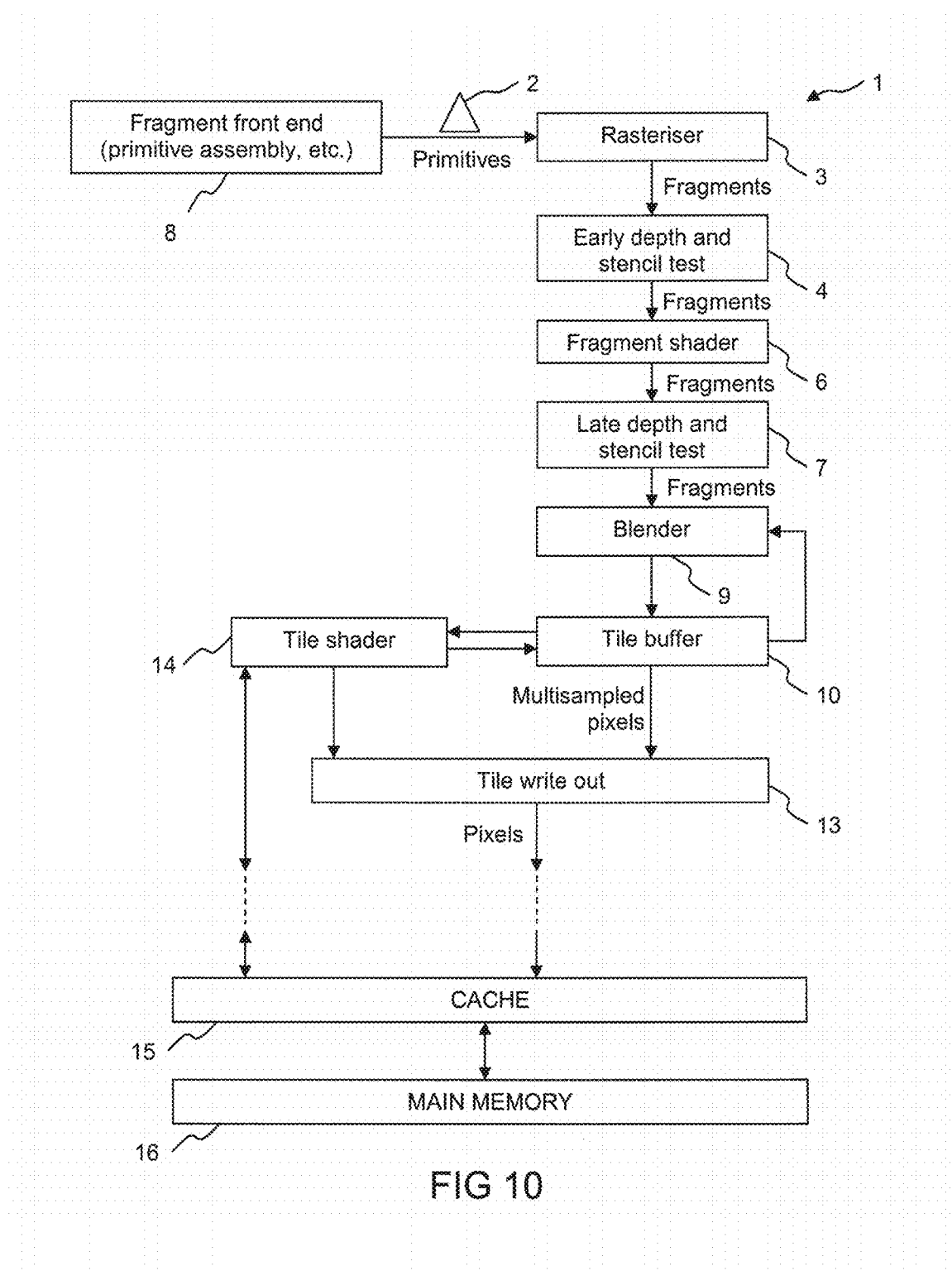
FIG. 10 shows schematically a graphics processing pipeline that can be operated in the manner of the technology described herein.

FIG. 10 shows schematically a graphics processing pipeline 1 that may operate in accordance with the technology described herein.

FIG. 10 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 10. It should also be noted here that FIG. 10 is only schematic, and that, for example, in practice the shown functional units and pipeline stages may share significant hardware circuits, even though they are shown schematically as separate stages in FIG. 10. It will also be appreciated that each of the stages, elements and units, etc., of the graphics processing pipeline as shown in FIG. 10 may be implemented as desired and will accordingly comprise, e.g., appropriate circuitry and/or processing logic, etc., for performing the necessary operation and functions.

FIG. 10 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor, as is known in the art.

As shown in FIG. 10, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown), in main memory 16. There may also be a cache 15, associated with the main memory 16, as is known in the art. (The display device could comprise, e.g., a display comprising an array of pixels, such as a computer monitor or a printer.)

The downsampling and writeout unit 13 downsamples the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory 16) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 in accordance with embodiments of the technology described herein will now be described.

As shown in FIG. 10, the graphics processing pipeline 1 also includes a programmable processing stage in the form of a tile shader 14 that can read stored values in the tile buffer 10 to perform processing operations on those values, and then write the results of its processing operation either back to the tile buffer 10 or out to main memory via the tile write out unit 13. This tile shading operation can accordingly make use of the rendered fragment values produced by the fragment shader, etc., and stored in the tile buffer 10 as its inputs without requiring those fragment values to be written out to external memory and then read back through the graphics processing pipeline 1 in order to perform the tile shader processing operation.

As shown in FIG. 10, the tile shader 14 can also operate to store data in and read data from the main memory 16 and cache memory 15. This then allows the tile shader 14 to store sampling position values from a tile for use with an adjacent tile and to make use of adjacent tile data values stored in the main memory 16 and cache 15 when performing its processing operations.

This arrangement allows a wide variety of processing operations to be performed with reduced memory bandwidth and energy consumption, as discussed above.

The tile shader stage 14 in the present embodiment shares processing circuitry with the fragment shader 6. Thus the tile shader 14 and the fragment shader 6 are provided by shared hardware in the form of a programmable hardware stage that can execute one sequence of graphics processing threads to first generate and then store in the tile buffer 10 fragment date values, and then execute a second sequence of graphics processing threads to process the fragment data values within the tile buffer 10.

(In other words, there is a programmable hardware element (circuitry) that can be configured by appropriate graphics program instructions to perform fragment shading operations (thereby acting as the fragment shader 6) or to perform tile shading operations (thereby acting as the tile shader 14). This programmable hardware element supports multi-threaded processing and so can serve both these functions and others.)

In the present embodiment, the tile shader 14 is implemented by extending the OpenGL ES shading language with a new shader type, GL_TILE_SHADER, and new built-in variables. This allows support for the tile shader stage 14 to be fitted within the existing shader programming model. This new shader type is not attached to the program object, but rather to the frame buffer object. In the present embodiment the tile shader 14 works like a regular OpenGL ES shader, but allows functions for reading and writing to generic memory, random write-access to textures using image write functions, and functions for reading and writing to the tile buffer.

The tile shader 14 is able to read as inputs for any given processing operation (e.g. thread) any location within the tile in the tile buffer 10, and also to write data to any location within the tile that is stored in the tile buffer 10. This is facilitated in the present embodiment by the following API functions:

gl_ReadTilePixelColor (int2 loc, cb, ms)
gl_ReadTilePixelDepth (int2 loc, ms)
gl_WriteTilePixelColor (int2 loc, cb, ms, color)
gl_WriteTilePixelDepth (ing2 loc, ms, color)
where
cb=index of colour buffer (this is used where there are multiple render targets (multiple colour buffers) stored in the tile buffer 10),
ms=index of sample (where multisampling is facilitated) and
loc=pixel coordinates in screen space.

Write out from the tile shader 14 can be done either with generic load/store to memory from the tile shader 14 or by writing the data back to tile buffer 10 and then triggering fixed function write out by the write out unit 13.

The tile shader 14 is also able to trigger or prevent a regular write-out of specific tile buffer components. This is achieved in the present embodiment by calling a function, gl_WriteOutColorTile (cb, [s]), gl_WriteOutDepthTile ([s]), where cb is the colour buffer index and s is the sample index to use (this index controls what sample to write out as the final value). These functions flag the tile for write out (or not) of the colour or depth buffer. (The write out (if required) occurs after the tile shader has finished its processing.)

In the present embodiment, the operation of the tile shader 14 is triggered by use of an API call for that purpose:

glResolveTiles (x, y, w, h, xthreads, ythreads)

The effect of this "resolve" API call is that a "resolve" (begin tile processing/tile shader triggering) command is added to the command list of each tile containing pixels within the rectangle indicated in the resolve API call ((x, y, w, h) in pixel coordinates).

Then, when a tile is being processed by the graphics processing pipeline and a "resolve" command is encountered in the tile command list, the graphics processing pipeline 1 operates as follows.

First, it waits for all generated fragment threads for the current tile to complete and be committed to the tile buffer. This ensures that the tile buffer contains the final rendered data for the tile in question before the tile shader 14 begins its operation.

Tile shader threads are then issued for each location that lies within the current tile to execute the tile shader program for each location that lies within the current tile. Each thread performs the relevant tile shading process for a given pixel within the tile, and may access as its inputs data from sample positions associated with different pixels as well as or instead of the pixel it is actually "processing". Once all the tile shading threads have completed, the command list is then resumed.

In the present embodiment the tile shader 14 may be used, for example, and as discussed above, to perform a deferred shading operation on the rendered tiles in the tile buffer 10 before they are written to external memory. This may be to perform deferred lighting or any other desired deferred shading operation.

The tile shader 14 can be used to allow the entire deferred shading process to be done on a tile-by-tile basis, thereby saving significantly on external memory bandwidth for performing deferred shading.

To do this, the tile buffer 10 is configured to be able to hold multiple render targets simultaneously such that multiple G-buffers and a colour buffer for accumulating the output results can be stored in the tile buffer 10 simultaneously. This may be achieved as desired. For example it may be that the tile buffer 10 is of sufficient size that it can accommodate, in effect, colour buffers for multiple tiles in any event. In this case each tile colour buffer could be designated as an appropriate render target. Alternatively, the techniques described in the Applicant's U.S. patent application Ser. No. 13/875,831, which is incorporated herein in its entirety by reference, could be used to allow the tile buffer 10 to be able to hold the required multiple render targets.

In this process, when processing a given tile, the graphics processing pipeline 1 is first controlled to render to respective separate render targets, the rendered geometry (G-buffers) required for the deferred shading operation. This processing pass may generate, for example, render targets for the tile comprising colour, depth, surface normals, and other attributes that are then stored separately in the tile buffer 10. (As is known in the art, when performing deferred shading, these values are then used to do complex light calculations and composition to produce the final desired output result.)

Once these render targets have been generated for the tile in question, the tile shader 14 operation can then be triggered by including an appropriate resolve command in the tile command list, with the tile shader 14 being appropriately controlled to read data from the plural render targets in the tile buffer 10 and data stored from previously processed tiles, process that data, and then write the processing result into a separate output colour buffer render target in the tile buffer 10.

The tile shader 14 will accordingly read as input values stored sample values from some or all of the generated render targets that are stored in the tile buffer 10, and, where required, data stored from previously processed tiles (an adjacent tile or tiles) (as discussed above), perform a deferred shading operation using those values, and then store the result of that operation in the separate output colour buffer that has been allocated for that purpose. Depending upon the exact deferred shading operation that is being performed, the tile shader 14 when performing the deferred shading operation for a given pixel may read only the sample values associated with that pixel in each render target and/or it may read sample values associated with one or more other (different) pixels in each render target. The tile shader 14 is configured to be able to perform either of these tasks under the control of appropriate graphics program instructions.

Once this operation has been completed, the tile shader 14 triggers the writing out of the output result render target to external memory.

The tile shader 14 is also triggered, in accordance with the technology described herein, to store some but not all of the sampling position values of the render targets that have been generated for the tile in the tile buffer 10 for use when processing a subsequent (adjacent) tile or tiles of the set of tiles (if present). However, other than the sampling position values that are to be retained for processing an adjacent tile or tiles (as discussed above), it otherwise disables writing the render targets that contain the G-buffers to memory. This can be achieved using the appropriate tile write functions discussed above.

In an alternative arrangement, the tile shader 14 could instead store the sampling position values of the render targets that have been generated for the tile for use when processing a subsequent (adjacent) tile or tiles of the set of tiles in the main memory 16 (and cache 15), e.g. if the local (on-chip) memory is insufficient for this.

This process is repeated appropriately for each tile of the output to be generated, such that a final deferred shaded output, e.g. frame, can be generated.

Figure 11:
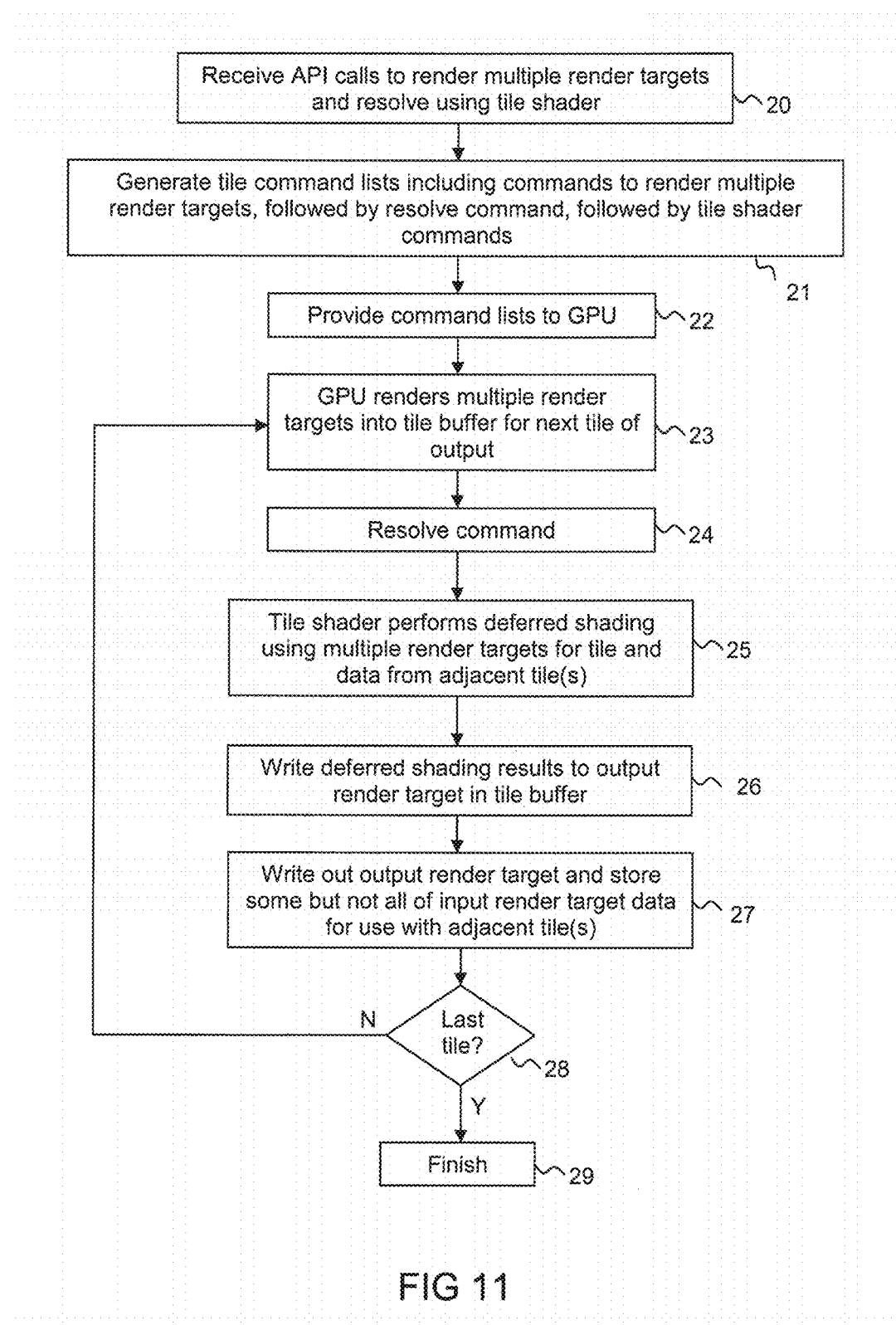
FIG. 11 shows schematically an embodiment of the operation of the graphics processing pipeline of FIG. 10.

FIG. 11 illustrates this process.

As shown in FIG. 11, the driver for the graphics processing pipeline (that may, e.g., be running on a host processor) will receive API calls to render multiple render targets for a deferred shading operation, and to then perform a tile shader "resolve" operation to perform the deferred shading operation(s) on the multiple render targets (step 20). In response to this, the driver will generate appropriate tile command lists, including commands to render the multiple input render targets, followed by a "resolve" command to trigger the tile shader operation, and commands to cause the tile shader to perform the deferred shading operation (step 21).

These command lists are then provided to the graphics processing pipeline (step 22) which then, in response to the commands, renders the multiple input data render targets for each tile of the overall render output in turn (step 23) to store the multiple input data render targets on a tile-by-tile basis in the tile buffer 10. As the multiple render targets for each tile are rendered, when the graphics processing pipeline sees the tile "resolve" command (step 24), it waits until all the rendering operations in flight have been completed and then executes the appropriate tile shader program to perform the deferred shading operation(s) using the stored multiple render targets and, where appropriate, stored sampling position data stored from a previous adjacent tile or tiles (step 25). The result of the deferred shading operation is written to a further "output" render target in the tile buffer 10 (step 26). Once the tile in question has been processed, the "output" render target tile is written out to external memory, and the sampling position values from the render targets for the tile in question required for use with a subsequent adjacent tile or tiles are stored in the tile buffer 10 while otherwise preventing the write out of the multiple input data value render targets (step 27). The process then moves on to the next tile (step 28) until all the tiles for the render output have been processed (step 29).

It can be seen from the above, the technology described herein, in its embodiments at least, comprises mechanisms whereby, e.g., deferred shading operations can be performed upon rendered tile data within a tile-based graphics processing pipeline, with reduced storage and subsequent re-storage of data to and from external memory. This can then reduce the amount of bandwidth and memory needed for particular processing operations in a tile-based graphics processing system.

This is achieved, in embodiments of the technology described herein at least, by retaining sampling position values for one or more, but not all, sampling positions of a tile for use when processing an adjacent tile.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a tile-based graphics processing pipeline that comprises:
a plurality of processing stages, including at least a rasteriser that rasterises input primitives to generate graphics fragments to be processed, each graphics fragment representing one or more sampling positions, and a renderer that processes fragments generated by the rasteriser to generate rendered fragment data;
a tile buffer configured to store rendered fragment data locally to the graphics processing pipeline prior to that data being written out to an external memory; and
a write out stage configured to write data stored in said tile buffer to an external memory; the method comprising:
the graphics processing pipeline, when processing a set of tiles to generate an output, each tile comprising an array of plural sampling positions:
performing a processing operation for plural sampling positions of a first tile of the set of tiles by:
rendering at least one render target containing data to be used in said processing operation, and storing the at least one render target in said tile buffer, each render target comprising an array of sampling position values corresponding to an array of sampling positions for the first tile;
performing said processing operation for the first tile using sampling position values from the stored at least one render target for the first tile stored in said tile buffer to generate output values for plural sampling positions within the first tile; and
storing some but not all of the sampling position values for a render target or targets of the at least one render target stored in said tile buffer for the first tile for use when performing said processing operation for at least one other tile of the set of tiles; and
performing said processing operation for plural sampling positions of another tile of the set of tiles by:
rendering for the another tile at least one render target containing data to be used in said processing operation, and storing the at least one render target in said tile buffer, each render target comprising an array of sampling position values corresponding to an array of sampling positions for the another tile; and
performing said processing operation for the another tile to generate output values for plural sampling positions within the another tile using, for some of the plural sampling positions within the another tile, only sampling position values from the at least one render target for the another tile stored in said tile buffer, but for others of the plural sampling positions within the another tile, sampling position values from the at least one render target for the another tile stored in said tile buffer and one or more of the sampling position values from the first tile that were stored for use when performing said processing operation for at least one other tile of the set of tiles.

2. The method of claim 1, wherein the set of tiles includes four or more tiles, and the method comprises, for two or more of the tiles of the set of tiles:
rendering at least one render target containing data to be used in said processing operation, and
storing the at least one render target in said tile buffer;
storing some but not all of the sampling position values for a render target or targets of the at least one render target stored in said tile buffer for the tile for use when performing said processing operation for at least one other tile of the set of tiles; and
performing said processing operation for the tile using the at least one render target or targets for the tile stored in said tile buffer and one or more stored sampling position values from at least one other tile of the set of tiles, to generate an output for the tile.

3. The method of claim 1, wherein:
the step of storing some but not all of the sampling position values for a render target or targets of the at least one render target stored in said tile buffer for the first tile for use when performing said processing operation for at least one other tile of the set of tiles comprises storing some but not all of the sampling position values for a render target or targets of the at least one render target stored in said tile buffer generated for the first tile for use when performing said processing operation for at least one adjacent tile of the set of tiles; and:
the another tile of the set of tiles for which said processing operation uses the sampling position values stored from the first tile comprises a tile of the set of tiles that is adjacent to the first tile.

4. The method of claim 1, wherein said processing operation comprises one of: a deferred shading operation; a data compression or decompression operation; and an image processing operation.

5. The method of claim 1, wherein said processing operation is performed by a programmable processing stage of the graphics processing pipeline.

6. The method of claim 1, wherein:
said processing operation derives an output value for one or more sampling positions of a tile;
said processing operation uses, for each sampling position that an output value is generated for, sampling position values from a set of plural sampling positions to generate the output value; and
each set of plural sampling positions that is used to generate an output value for a sampling position is configured such that the sampling position for which the output value is being generated using the set of plural sampling positions is a sampling position that lies at a corner of the set of sampling positions.

7. The method of claim 1, wherein:
said processing operation derives an output value for one or more sampling positions of a tile and uses a set of plural sampling position values to produce each output value; and the method comprises:
selecting the sampling position values that are stored for use when performing said processing operation for another tile based on the size and shape of the set of sampling position values that said processing operation uses to produce each output value.

8. The method of claim 1, wherein the sampling position data that is stored for use when performing said processing operation for another tile or tiles is stored in a cache memory associated with and accessible to the graphics processing pipeline.

9. The method of claim 1, comprising processing the set of tiles in a selected order such that the tile or tiles whose sampling position values will be needed when performing said processing operation for another tile are processed before that another tile.

10. The method of claim 1, comprising writing the output of said processing operation to an output render target in said tile buffer, or to external memory.

11. The method of claim 1, comprising storing the output of said processing operation for use as an input value or values for another tile of the set of tiles to be processed.

12. A method of operating a tile-based graphics processing pipeline that comprises:
a plurality of processing stages, including at least a rasteriser that rasterises input primitives to generate graphics fragments to be processed, each graphics fragment representing one or more sampling positions, and a renderer that processes fragments generated by the rasteriser to generate rendered fragment data;
a tile buffer configured to store rendered fragment data locally to the graphics processing pipeline prior to that data being written out to an external memory; and
a write out stage configured to write data stored in said tile buffer to an external memory; the method comprising:
the graphics processing pipeline, when processing a set of tiles to generate an output, each tile comprising an array of plural sampling positions:
performing a processing operation for plural sampling positions of at least one tile of the set of tiles by:
rendering at least one render target containing data to be used in said processing operation, and storing the at least one render target in said tile buffer, each render target comprising an array of sampling position values corresponding to an array of sampling positions for the tile in question;
reading from memory some but not all of the sampling position values from one or more render targets generated for a previously processed tile of the set of tiles; and
performing said processing operation for the tile to generate output values for plural sampling positions within the tile using, for some of the plural sampling positions within the tile, only sampling position values from the at least one render target for the tile stored in said tile buffer, but for others of the plural sampling positions within the tile, sampling position values from the at least one render target for the tile stored in said tile buffer and the read sampling position values from one or more render targets of a previously processed tile of the set of tiles.

13. A tile-based graphics processing pipeline comprising:
a plurality of processing stages, including at least a rasteriser that rasterises input primitives to generate graphics fragments to be processed, each graphics fragment representing one or more sampling positions, and a renderer that processes fragments generated by the rasteriser to generate rendered fragment data;
a tile buffer configured to store rendered fragment data locally to the graphics processing pipeline prior to that data being written out to an external memory; and
a write out stage configured to write data stored in said tile buffer to an external memory; wherein:
the graphics processing pipeline is configured to, when processing a set of tiles to generate an output, each tile comprising an array of plural sampling positions:
perform a processing operation for plural sampling positions of a first tile of the set of tiles by:
rendering at least one render target containing data to be used in said processing operation, and storing the at least one render target in said tile buffer, each render target comprising an array of sampling position values corresponding to an array of sampling positions for the first tile;
performing said processing operation for the first tile using sampling position values from the at least one render target for the first tile stored in said tile buffer to generate output values for plural sampling positions within the first tile; and
storing some but not all of the sampling position values for a render target or targets of the at least one render target stored in said tile buffer for the first tile for use when performing said processing operation for at least one other tile of the set of tiles; and perform said processing operation for plural sampling positions of another tile of the set of tiles by:
rendering for the another tile at least one render target containing data to be used in said processing operation, and storing the at least one render target in said tile buffer, each render target comprising an array of sampling position values corresponding to an array of sampling positions for the another tile; and
performing said processing operation for the another tile to generate output values for plural sampling positions within the another tile using, for some of the plural sampling positions within the another tile, only sampling position values from the at least one render target for the another tile stored in said tile buffer, but for others of the plural sampling positions within the another tile, sampling position values from the stored at least one render target for the another tile stored in said tile buffer and one or more of the sampling position values from the first tile that were stored for use when performing said processing operation for at least one other tile of the set of tiles.

14. The graphics processing pipeline of claim 13, wherein the set of tiles includes four or more tiles, and the graphics processing pipeline is configured to, for two or more of the tiles of the set of tiles:
render at least one render target containing data to be used in said processing operation, and
store the at least one render target in said tile buffer; store some but not all of the sampling position values for a render target or targets of the at least one render target stored in said tile buffer for the tile for use when performing said processing operation for at least one other tile of the set of tiles; and
perform said processing operation for the tile using the at least one render target or targets for the tile stored in said tile buffer and one or more stored sampling position values from at least one other tile of the set of tiles, to generate an output for the tile.

15. The graphics processing pipeline of claim 13, wherein the graphics processing pipeline is configured to:

store some but not all of the sampling position values for a render target or targets of the at least one render target stored in said tile buffer generated for the first tile for use when performing said processing operation for at least one adjacent tile of the set of tiles; and the another tile of the set of tiles for which said processing operation then uses the sampling position values stored from the first tile comprises a tile of the set of tiles that is adjacent to the first tile.

16. The graphics processing pipeline of claim 13, wherein said processing operation comprises one of: a deferred shading operation; a data compression or decompression operation; and an image processing operation.

17. The graphics processing pipeline of claim 13, wherein the graphics processing pipeline comprises a programmable processing stage that performs said processing operation.

18. The graphics processing pipeline of claim 13, wherein:
said processing operation derives an output value for one or more sampling positions of a tile;
said processing operation uses, for each sampling position that an output value is generated for, sampling position values from a set of plural sampling positions to generate the output value; and
each set of plural sampling positions that is used to generate an output value for a sampling position is configured such that the sampling position for which the output value is being generated using the set of plural sampling positions is a sampling position that lies at a corner of the set of sampling positions.

19. The graphics processing pipeline of claim 13, wherein:
said processing operation derives an output value for one or more sampling positions of a tile and uses a set of plural sampling position values to produce each output value; and
the graphics processing pipeline is configured to:
select the sampling position values that are stored for use when performing said processing operation for another tile based on the size and shape of the set of sampling position values that said processing operation uses to produce each output value.

20. The graphics processing pipeline of claim 13, wherein the sampling position data that is stored for use when performing said processing operation for another tile or tiles is stored in a cache memory associated with and accessible to the graphics processing pipeline.

21. The graphics processing pipeline of claim 13, wherein the graphics processing pipeline is configured to process the set of tiles in a selected order such that the tile or tiles whose sampling position values will be needed when performing said processing operation for another tile are processed before that another tile.

22. The graphics processing pipeline of claim 13, wherein the graphics processing pipeline is configured to write the output of said processing operation to an output render target in said tile buffer, or to external memory.

23. The graphics processing pipeline of claim 13, wherein the graphics processing pipeline is configured to store the output of said processing operation for use as an input value or values for another tile of the set of tiles to be processed.

24. A non-transitory computer readable storage medium storing computer software code which when executing on a processor performs a method of operating a tile-based graphics processing pipeline that comprises:
a plurality of processing stages, including at least a rasteriser that rasterises input primitives to generate graphics fragments to be processed, each graphics fragment representing one or more sampling positions, and a renderer that processes fragments generated by the rasteriser to generate rendered fragment data;
a tile buffer configured to store rendered fragment data locally to the graphics processing pipeline prior to that data being written out to an external memory; and
a write out stage configured to write data stored in said tile buffer to an external memory; the method comprising:
the graphics processing pipeline, when processing a set of tiles to generate an output, each tile comprising an array of plural sampling positions:
performing a processing operation for plural sampling positions of a first tile of the set of tiles by:
rendering at least one render target containing data to be used in said processing operation, and storing the at least one render target in said tile buffer, each render target comprising an array of sampling position values corresponding to an array of sampling positions for the first tile;
performing said processing operation for the first tile using sampling position values from the at least one render target for the first tile stored in said tile buffer to generate output values for plural sampling positions within the first tile; and
storing some but not all of the sampling position values for a render target or targets of the at least one render target stored in said tile buffer for the first tile for use when performing said processing operation for at least one other tile of the set of tiles; and
performing said processing operation for plural sampling positions of another tile of the set of tiles by:
rendering for the another tile at least one render target containing data to be used in said processing operation, and storing the at least one render target in said tile buffer, each render target comprising an array of sampling position values corresponding to an array of sampling positions for the another tile; and
performing said processing operation for the another tile to generate output values for plural sampling positions within the another tile using, for some of the plural sampling positions within the another tile, only sampling position values from the at least one render target for the another tile stored in said tile buffer, but for others of the plural sampling positions within the another tile, sampling position values from the at least one render target for the another tile stored in said tile buffer and one or more of the sampling position values from the first tile that were stored for use when performing said processing operation for at least one other tile of the set of tiles to generate an output for the another tile.

* * * * *